United States Patent
Hwang et al.

(10) Patent No.: US 8,451,103 B2
(45) Date of Patent: *May 28, 2013

(54) MOBILE DEVICE AND METHOD FOR CONTROLLING VIBRATION THEREOF

(75) Inventors: Hyokune Hwang, Seoul (KR); Inho Choi, Seoul (KR); Jaeyeol Kim, Seoul (KR); Sunuk Kim, Seoul (KR); Jaecheon Sa, Seoul (KR); Munchae Joung, Seoul (KR)

(73) Assignee: LG Electronics Inc., Seoul (KR)

( * ) Notice: Subject to any disclaimer, the term of this patent is extended or adjusted under 35 U.S.C. 154(b) by 440 days.

This patent is subject to a terminal disclaimer.

(21) Appl. No.: 12/841,004

(22) Filed: Jul. 21, 2010

(65) Prior Publication Data

US 2011/0025480 A1 Feb. 3, 2011

Related U.S. Application Data

(60) Provisional application No. 61/230,109, filed on Jul. 31, 2009.

(30) Foreign Application Priority Data

Sep. 8, 2009 (KR) .................. 10-2009-0084446

(51) Int. Cl.
H04B 3/36 (2006.01)
(52) U.S. Cl.
USPC ...................................................... 340/407.1
(58) Field of Classification Search
USPC ...................................................... 340/407.1
See application file for complete search history.

(56) References Cited

U.S. PATENT DOCUMENTS

| | | | |
|---|---|---|---|
| 2002/0177471 A1* | 11/2002 | Kaaresoja et al. | 455/567 |
| 2004/0192374 A1 | 9/2004 | Camarillo et al. | |
| 2005/0064912 A1 | 3/2005 | Yang et al. | |
| 2007/0176742 A1* | 8/2007 | Hofmann et al. | 340/7.6 |
| 2008/0122797 A1* | 5/2008 | Soh et al. | 345/173 |
| 2008/0153554 A1 | 6/2008 | Yoon et al. | |
| 2009/0051509 A1* | 2/2009 | Hwang | 340/407.2 |
| 2011/0025480 A1* | 2/2011 | Hwang et al. | 340/407.1 |

OTHER PUBLICATIONS

Bensmaia et al., "Vibrotactile intensity and frequency information in the Pacinian system: A psychophysical model," Perception & Psychophysics, 2005, vol. 67, No. 5, pp. 828-841.
Israr et al., "Detection Threshold and Mechanical Impedance of the Hand in a Pen-Hold Posture," Proceedings of the 2006 IEEE/RSJ International Conference on Intelligent Robots and Systems, Oct. 2006, 1-4244-0259-X, pp. 472-477.
Israr et al., "Mechanical Impedance of the Hand Holding a Spherical Tool at Threshold and Suprathreshold Stimulation Levels," 2007.
Morioka et al., "Magnitude-dependence of equivalent comfort contours for fore-and-aft, lateral and vertical hand-transmitted vibration," Journal of Sound and Vibration, vol. 295, Apr. 11, 2006, pp. 633-648.
Seo et al., "Creating Linearly Moving Vibrotactile Sensation on Mobile Device," pp. 193-195, 2010.

* cited by examiner

*Primary Examiner* — Travis Hunnings
(74) *Attorney, Agent, or Firm* — Birch, Kolasch & Birch, LLP

(57) ABSTRACT

A mobile device for controlling a vibration includes an input unit configured to receive an input from a user or an external device; an output unit configured to generate an output; a vibration pattern generation unit configured to generate a vibration, and to move a center of the vibration within the mobile device according to the input from the input unit or the output from the output unit; and a control unit configured to control the vibration pattern generation unit so as to create a moving vibration sensation from a movement of the center of the vibration.

20 Claims, 34 Drawing Sheets

MOBILE DEVICE AND METHOD FOR CONTROLLING VIBRATION THEREOF

CROSS-REFERENCE TO RELATED APPLICATIONS

The present application claims priority under 35 U.S.C. 119 and 35 U.S.C. 365 to Korean Patent Application No. 10-2009-0084446 filed on Sep. 8, 2009, which is hereby incorporated by reference in its entirety.

BACKGROUND OF THE INVENTION

1. Field of the Invention

Embodiments of the invention relate to an apparatus for controlling a vibration and a method thereof.

2. Discussion of the Related Art

A vibration generation device is installed in a mobile device, and thus is widely being used as a unit for informing receipt of signals in the mobile device. Recently, the vibration generating device is installed in a game console, and thus is widely being used as a unit for transmitting an effect of a game to a user.

A mobile device launched in recent years outputs voice or vibration in response to an input of a user to provide a function for providing a feedback corresponding to the input of the user.

In particular, in a case of a mobile device to which a haptic technology is applied, a vibration generation unit, which generates a vibration having unique feeling or sensation different from that of a related art vibration generation unit to provide haptic feedback having various forms in response to various inputs to the user, is being actively developed.

SUMMARY OF THE INVENTION

Embodiments of the invention relate to a mobile device that provides a dynamic vibration based on an input value received into the mobile device and on output value outputted from the mobile device and a method for controlling a vibration thereof.

In one embodiment, a mobile device for controlling a vibration includes an input unit configured to receive an input from a user or an external device; an output unit configured to generate an output; a vibration pattern generation unit configured to generate a vibration, and to move a center of the vibration within the mobile device according to the input from the input unit or the output from the output unit; and a control unit configured to control the vibration pattern generation unit so as to create a moving vibration sensation from a movement of the center of the vibration.

In another embodiment, a method for controlling a vibration in a mobile device includes receiving an input via an input unit of the mobile device or an output from an output unit of the mobile device; generating the vibration; and moving a center of the vibration within the mobile device according to the input or the output.

The mobile device may realize a haptic effect in which the vibration is moved within the mobile device according to various input values received into the mobile device, e.g., a user input value or movement data of the mobile device, and various output values outputted from the mobile device, e.g., a variation or change of a displayed image or a variation or change of outputted sound.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the invention, examples of which are illustrated in the accompanying drawings.

Figure 1:
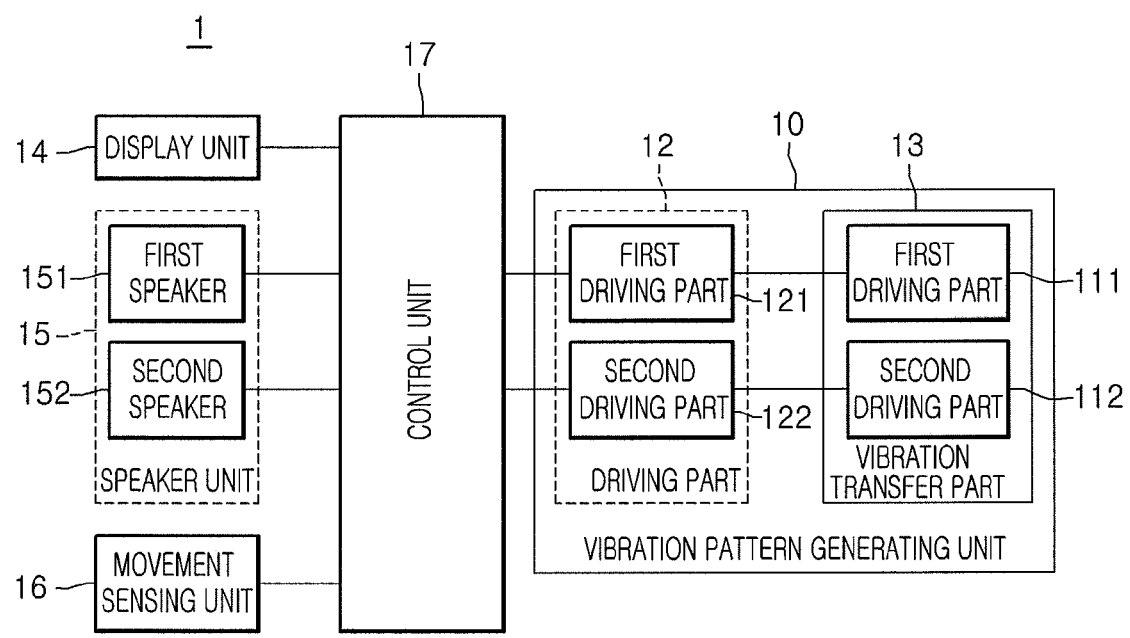
FIG. 1 is a block diagram of a mobile device according to an embodiment of the invention.

FIG. 1 is a block diagram of a mobile device according to an embodiment of the invention.

Referring to FIG. 1, a mobile device 1 according to an embodiment of the invention includes a display unit 14, a vibration pattern generation unit 10, and a control unit 17. The display unit 14 displays an image. The vibration pattern generation unit 10 generates vibration and moves a vibration minimum point generated by the vibration pattern generation unit 10 on the display unit 14 according to an input or output value. The control unit 17 controls the vibration pattern generation unit 10 to move the vibration minimum point according to the input or output value.

The display unit 14 displays and outputs data processed in the mobile device 1, e.g., images or texts.

The vibration pattern generation unit 10 generates the vibration and moves the vibration minimum point generated by the vibration according to the input value inputted into the mobile device 1 or the output value outputted from the mobile device 1.

The above-described vibration minimum point will be described below with reference to FIGS. 3A to 3C.

The vibration pattern generation unit 10 according to an embodiment of the invention includes a vibration transfer part 13, at least one pair of oscillators 111 and 112, and at least one driving part 12. The vibration transfer part 13 transfers the vibration. The oscillators (first driving part) 111 and (second driving part) 112 generate the vibration and are disposed on positions facing each other on the vibration transfer part 13. The driving part 12 drives the oscillators 111 and 112.

The vibration transfer part 13 is a member for transferring the vibration. The oscillators 111 and 112 are disposed on predetermined positions of the vibration transfer part 13 to transfer the vibration generated by the oscillators 111 and 112 to the outside.

Hereinafter, according to this embodiment of the invention, the vibration transfer part 13 is a case constituting the mobile device, and the oscillators 111 and 112 are disposed on the positions facing each other on the vibration transfer part 13 according to embodiments of the invention, but the oscillators 111 and 112 need not be facing each other in other embodiments of the invention. However, the vibration transfer part 13 is not limited to the case of the mobile device, and thus may be constituted by a member having various shapes or configurations. Additionally, the vibration transfer part 13 need not be the case of a mobile device, but may simply be an existing portion of the mobile device, such as a display portion.

FIGS. 2A to 2F are plan views of vibration transfer parts according to embodiments of the invention.

Figure 2A:
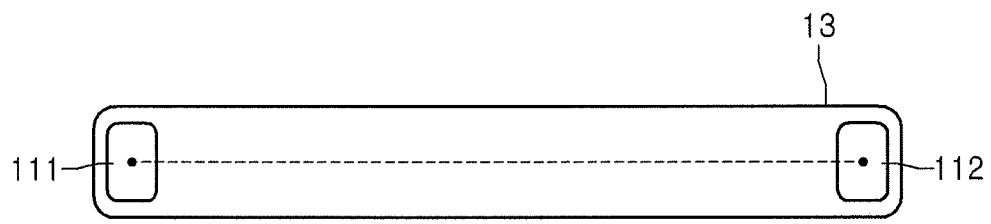
FIGS. 2A to 2F are plan views of vibration transfer parts according to embodiments of the invention.
Figure 2B:
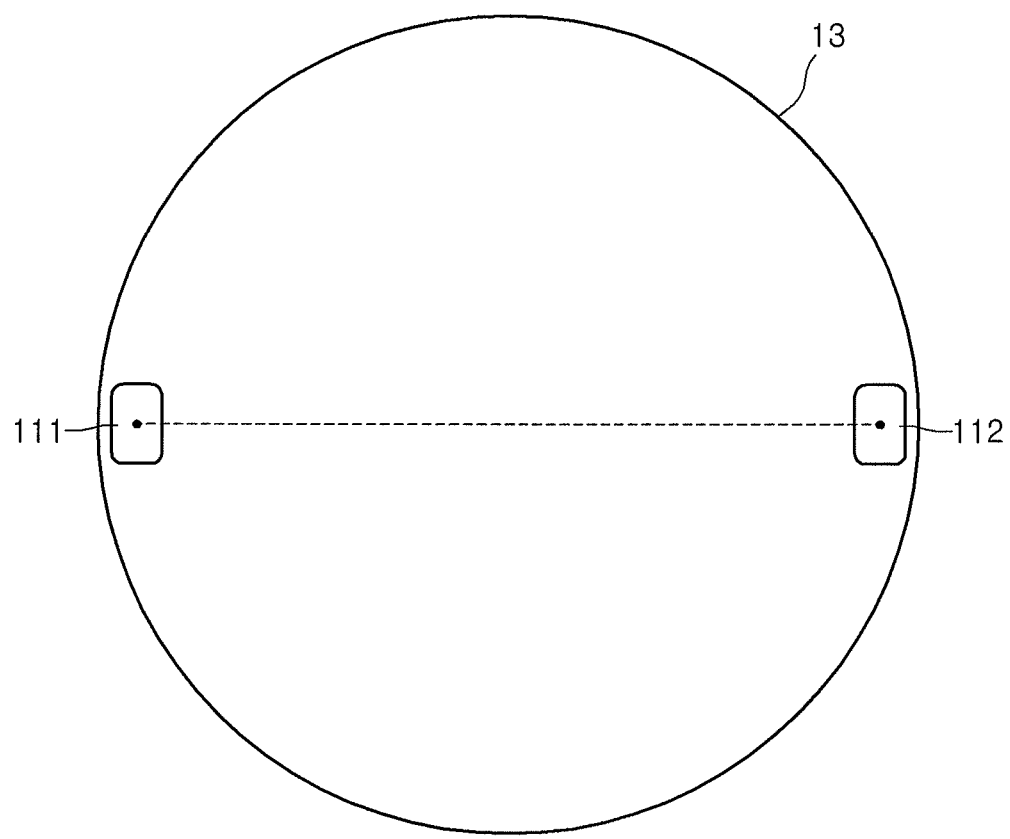
Figure 2C:
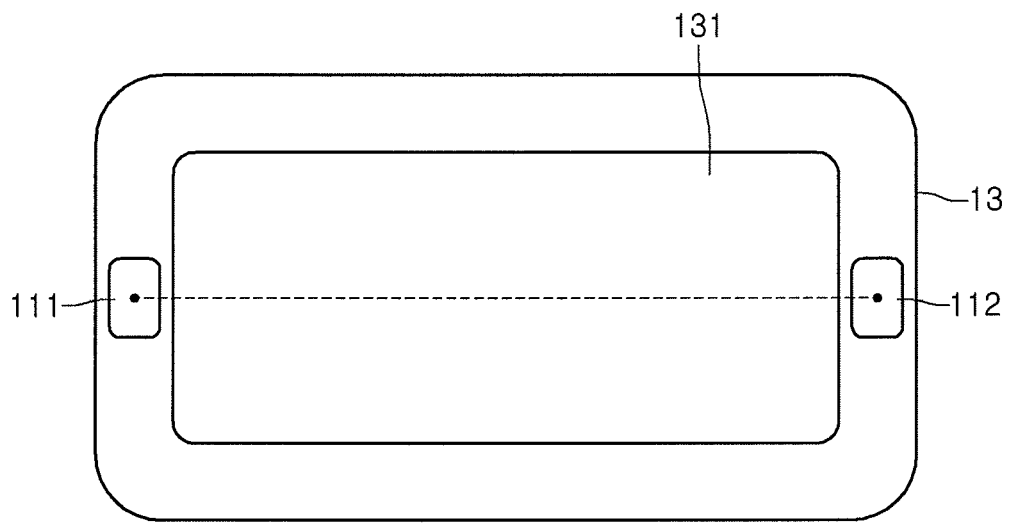
Figure 2D:
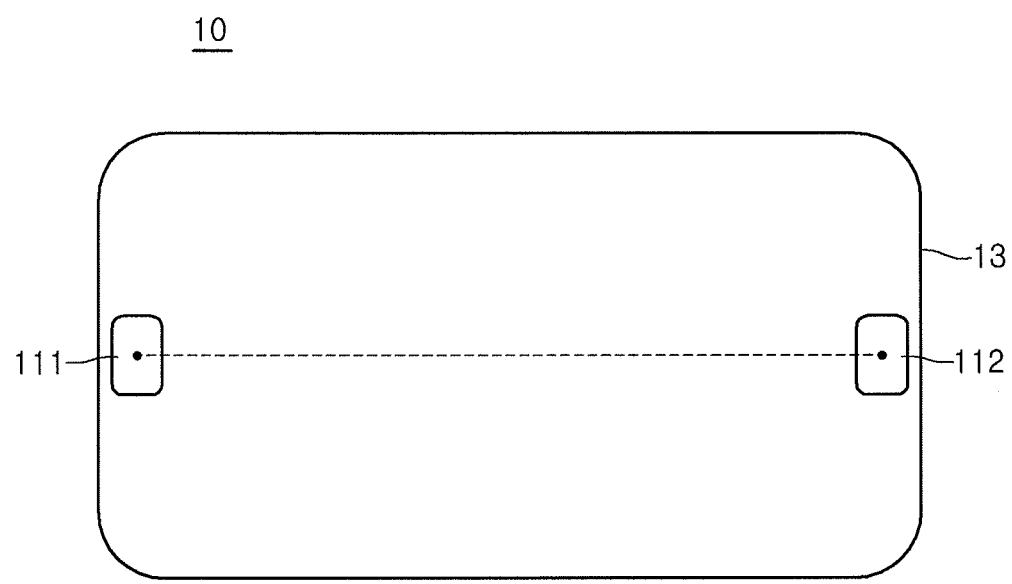
Figure 2E:
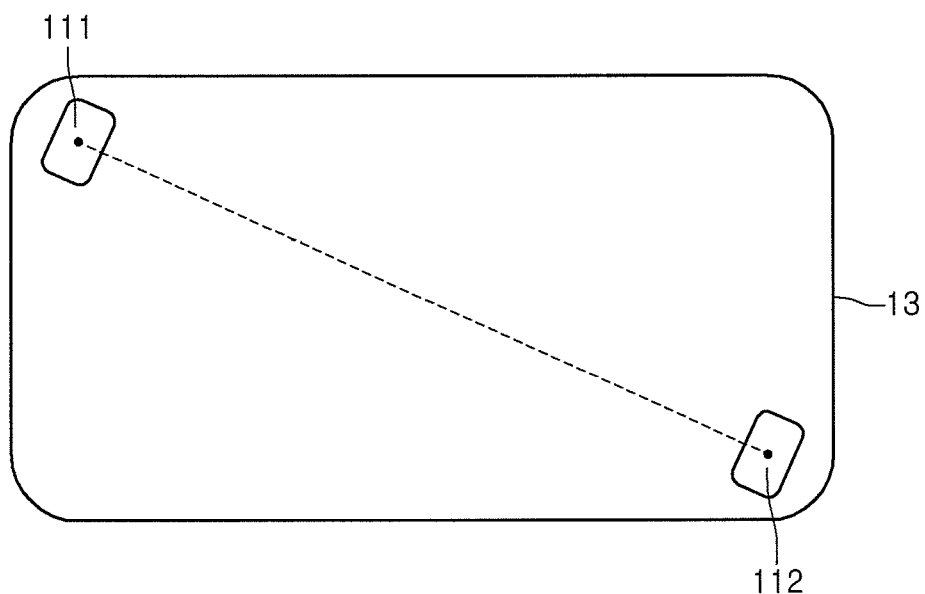

For example, where the vibration transfer part 13 is the case of the mobile device, the vibration transfer part 13 may have a plate shape as shown in FIGS. 2D and 2E.

As shown in FIG. 2A, the vibration transfer part 13 may have a bar shape.

The vibration transfer part 13 may have a polygonal shape, and also, the vibration transfer part 13 may be a disk having a circular shape as shown in FIG. 2B or a frame having an opening 131 as shown in FIG. 2C.

Referring to FIG. 2D, when the vibration pattern generation unit 10 includes the pair of oscillators 111 and 112, the pair of oscillators 111 and 112 may be disposed on the positions facing each other on the vibration transfer part 13.

The oscillators 111 and 112 generate the vibration. The oscillator according to an embodiment of the invention includes at least one pair of oscillators 111 and 112.

Hereinafter, the oscillator according to an embodiment of the invention includes two oscillators as an example, and the respective oscillators include a first oscillator 111 and a second oscillator 112. However, the embodiment of the invention is not limited thereto. For example, the oscillator may include three or four oscillators, or more.

The oscillators 111 and 112 receive driving power from the driving part 12 to generate the vibration.

The driving part 12 applies the driving power to the oscillators 111 and 112 to drive the oscillators 111 and 112.

According to an embodiment of the invention, the driving part 12 has the same number as the number of the oscillators to individually drive the respective oscillators. For example, when the oscillator 11 according to an embodiment of the invention includes the first oscillator 111 and the second oscillator 112, two driving parts, e.g., a first driving part 121 and a second driving part 122 are provided to independently drive the respective oscillators 111 and 112.

However, the driving part may be provided as one module that individually controls the plurality of oscillators 111 and 112.

According to an embodiment of the invention, in the vibration transfer part 13, the at least one pair of oscillators 111 and 112 may be disposed on positions facing each other.

FIGS. 2D to 2E illustrate placements of the oscillators 111 and 112 according to an embodiment of the invention as an example.

Referring to FIG. 2D, when the vibration pattern generation unit 10 includes the pair of oscillators 111 and 112, the pair of oscillators 111 and 112 may be disposed on the positions facing each other on the vibration transfer part 13 along a middle axial position.

Also, the oscillators 111 and 112 may be disposed on edges of the vibration transfer part 13 to face each other along a diagonal of the vibration transfer part 13.

For example, as shown in FIG. 2E, the oscillators 111 and 112 may be respectively disposed on edges of the vibration transfer part 13. In this instance, each of the pair of oscillators may be disposed facing each other. In this case, the oscillator 111 and the oscillator 112 are disposed facing each other to form one pair.

Figure 2F:
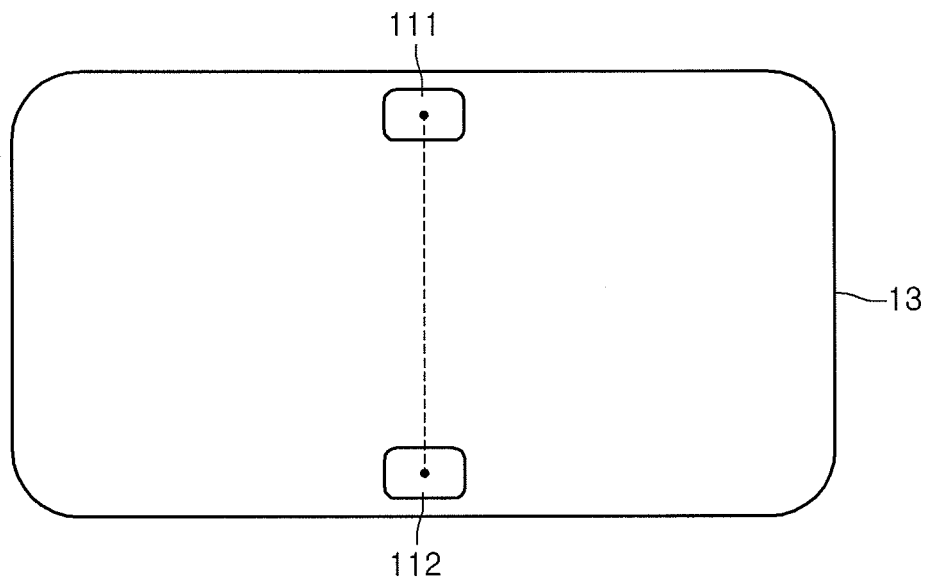

As shown in FIG. 2F, the oscillators 111 and 112 may be disposed on both ends of the vibration transfer part 13 in a short direction, such as the width direction, but in other embodiments, the oscillators 111 and 112 may be disposed on both ends of the vibration transfer part 13 in a long direction, such as the length direction.

The vibration pattern generation unit 10 moves the vibration minimum point defined by the vibration generated by the oscillators 111 and 112 under the control of the control unit 17 according to the input or output value of the mobile device 1.

The control unit 17 controls the vibration pattern generation unit 10 to move the vibration minimum point according to the input or output value.

According to an embodiment of the invention, the control unit 17 controls an intensity or phase of the vibration generated by the respective oscillators 111 and 112 to move the vibration minimum point. Accordingly, the control unit 17 may vary a frequency/resonance, intensity, a phase, or a combination thereof, of the vibration generated by the respective oscillators 111 and 112.

For example, the control unit 17 may respectively provide control signals to the driving part for driving the oscillators 111 and 112, i.e., the first driving part 121 and the second driving part 122 to control driving power applied to the oscillators 111 and 112, thereby controlling the intensity or phase of the vibration generated by the respective oscillators 111 and 112.

Thus, the control unit 17 independently controls the plurality of oscillators to control the intensity or phase of the vibration generated by the respective oscillators 111 and 112. As a result, the control unit 17 moves a center of percussion (COP) of the vibration transfer part 13 with respect to the vibration, that is to say, the vibration minimum point.

In this instance, the COP represents a point at which an effect by a rotation reaction is minimized when an object is moved by an external force. In this embodiment of the invention, when the vibration of the respective oscillators 111 and 112 is applied to the vibration transfer part 13 as an external force, the COP represents a point at which the movement due to the vibration is the fewest on the vibration transfer part 13.

Thus, the intensity of the vibration on the vibration transfer part 13 gradually increases in a direction away from the COP. Thus, the COP may be referred to as a point at which the intensity of the vibration is the lowest in a vibration distribution formed in the vibration pattern generation unit 10 due to the vibration generated by the pair of oscillators, i.e., referred to as the vibration minimum point or a vibration center that is a center of the vibration distribution.

Hereinafter, in this embodiment of the invention, the center of percussion formed in the vibration transfer part 13 due to the vibration generated by the respective oscillators 111 and 112 is referred to as the vibration minimum point and is depicted as COP in drawings.

Figure 3A:
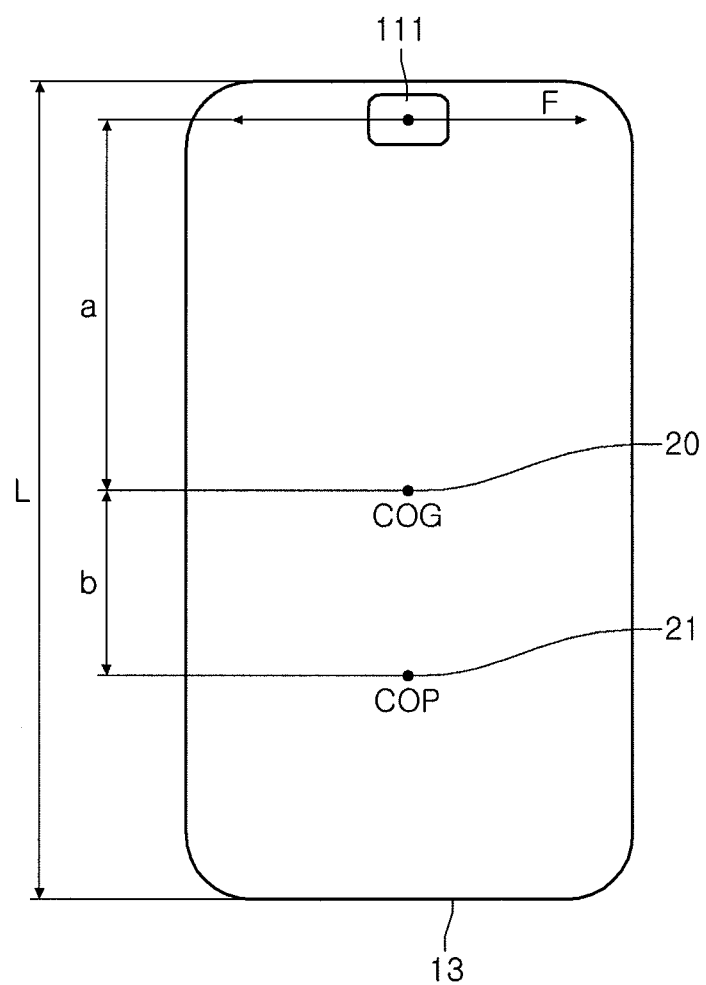
FIGS. 3A to 3C are views illustrating examples of positions and movements of a vibration center according to an embodiment of the invention.
Figure 3B:
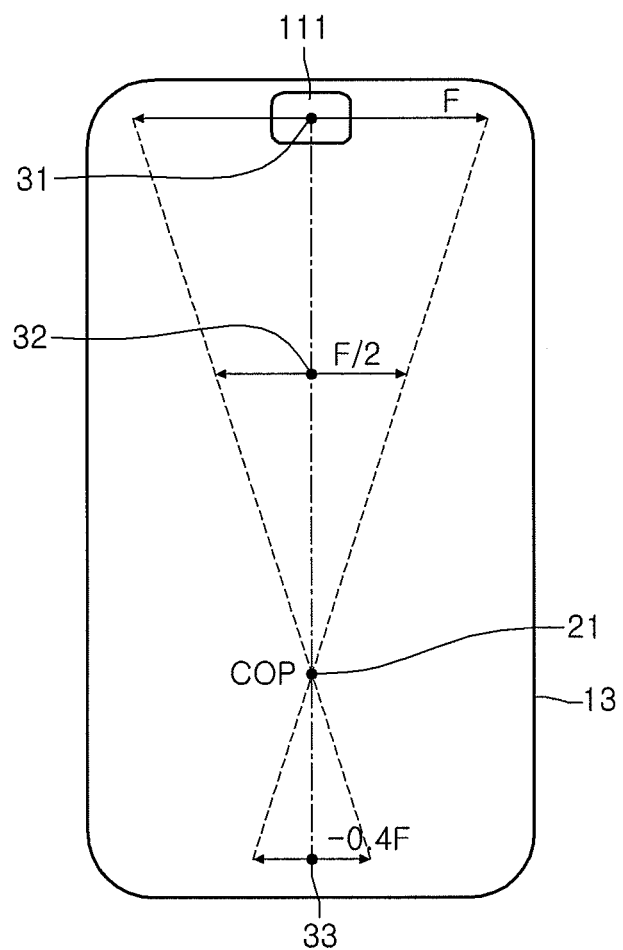
Figure 3C:
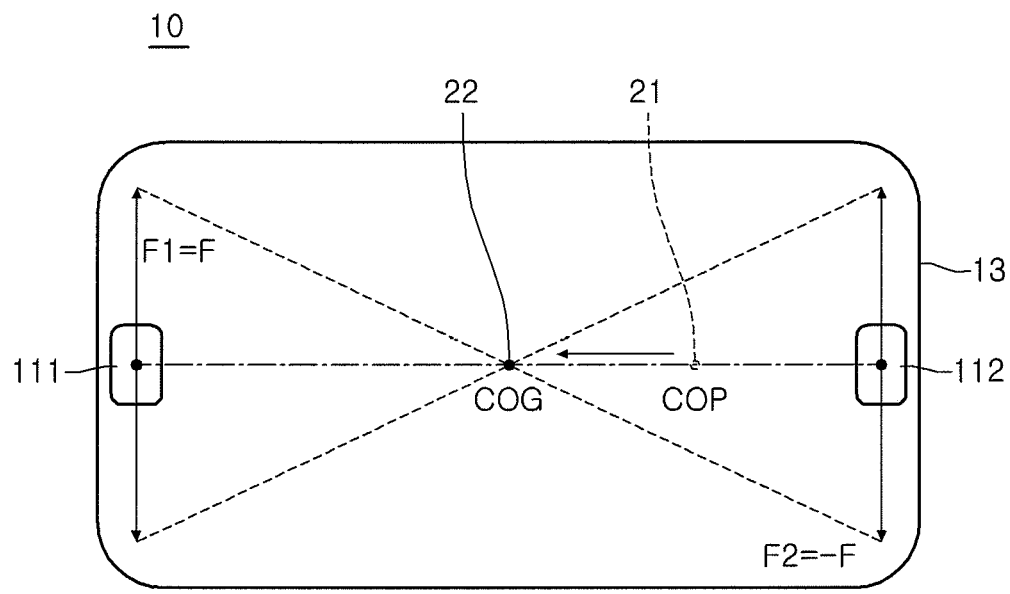

FIGS. 3A to 3C are views illustrating examples of position and movements of a vibration center according to an embodiment of the invention.

Referring to FIG. 3A, when the vibration transfer part 13 has a rectangular shape, a center of gravity (COG) 20 of the vibration transfer part 13 is disposed at a center of the rectangular shape. That is, if a longitudinal length of the vibration transfer part 13 is L, the COG 20 of the vibration transfer part 13 is disposed at an L/2 point.

In this instance, when the oscillator 111 is disposed on an end of the vibration transfer part 13 (that is, a=L/2 in FIG. 3A), a vibration minimum point (or a vibration center) 21 of the vibration transfer part 13 by the vibration of the oscillator 111 is calculated using following Equation:

$$b = L^2/12a = L/6$$ [Equation 1]

As described above, when the oscillator 111 is disposed on the end of the vibration transfer part 13, relationship a=L/2 is satisfied. Thus, the vibration minimum point 21 is disposed at a point spaced from the COG by L/6. As a result, the vibration minimum point 21 is disposed at a point 2L/3 of the vibration transfer part 13 (a+b=L/2+L/6=2L/3).

In this case, the vibration transfer part 13 has the vibration minimum point 21 at the above-described point with respect to a vibration intensity F of the oscillator 111. In this instance, an effect by the vibration is the lowest at the vibration minimum point 21.

That is, as shown in FIG. 3B, the vibration transfer part 13 is little affected by the vibration at the vibration minimum point 21 with respect to the horizontal vibration intensity F of the oscillator 111. Thus, the vibration does not occur at the vibration minimum point 21, and the intensity of the vibration gradually increases in a direction away from the vibration minimum point 21.

For example, as shown in FIG. 3B, when only one oscillator 111 is disposed on the end of the vibration transfer part 13, the vibration occurs at a point 31, at which the oscillator 111 is disposed, by the intensity F of the vibration generated by the oscillator 111, and the effect of the vibration generated by the oscillator 111 is reduced as approaching the vibration minimum point 21. Thus, a smaller vibration is generated (e.g., an intensity of the vibration occurring at a point 32 is F/2). As a result, the effect of the vibration generated by the oscillator 111 is minimized at the vibration minimum point 21, and thus, the vibration does not occur thereat.

Then, moving away from the vibration minimum point 21, the intensity of the vibration increases. However, the vibration is out-of-phase when compared to a phase of the vibration at a point before the vibration minimum point 21. For example, an intensity of the vibration occurring at a point 33 increases again to about 0.4 F, but a phase thereof is reversed and thus may be expressed by −0.4 F. Reference to an out-of-phase vibration includes a vibration of a different phase, such as a vibration that is off-phase or a vibration that is of an opposite phase.

In this instance, when the plurality of oscillators 111 and 112, e.g., two oscillators 111 and 112 are disposed on the vibration transfer part 13, the vibration minimum point 21 may be determined by an intensity and phase of the respective vibrations generated by the two oscillators 111 and 112.

For example, as shown in FIG. 3C, when the oscillators 111 and 112 are respectively disposed on both ends of the vibration transfer part 13, the vibration minimum point of the vibration transfer part 13 is moved to a new point 22 different from the vibration minimum point 21 of FIG. 3B.

In particular, the first oscillator 111 and the second oscillator 112 are disposed at both ends of the vibration transfer part 13 of FIG. 3C. In this instance, when the vibrations generated by the two oscillators 111 and 112 have the same intensity as each other and phases opposite to each other (F2=−F1), the vibration minimum point 22 of the vibration transfer part 13 is disposed at a middle point (or an intermediate portion) of a straight line connecting the first oscillator 111 to the second oscillator 112.

In the vibration pattern generation unit 10 according to an embodiment of the invention, at least two oscillators 111 and 112 are disposed on the vibration transfer part 13. Also, the intensity and phase of the vibration generated by the respective oscillators 111 and 112 are controlled to move the vibration minimum point or the locations of the vibration minimum point of the vibration transfer part 13 with respect to the vibration transfer part 13.

Hereinafter, a movement of the vibration minimum point according to the intensity or phase of the respective oscillators 111 and 112 will be described with reference to FIGS. 4A to 5D.

FIGS. 4A to 4I are views illustrating examples of operations of the vibration pattern generation unit 10 according to an embodiment of the invention.

Figure 4A:
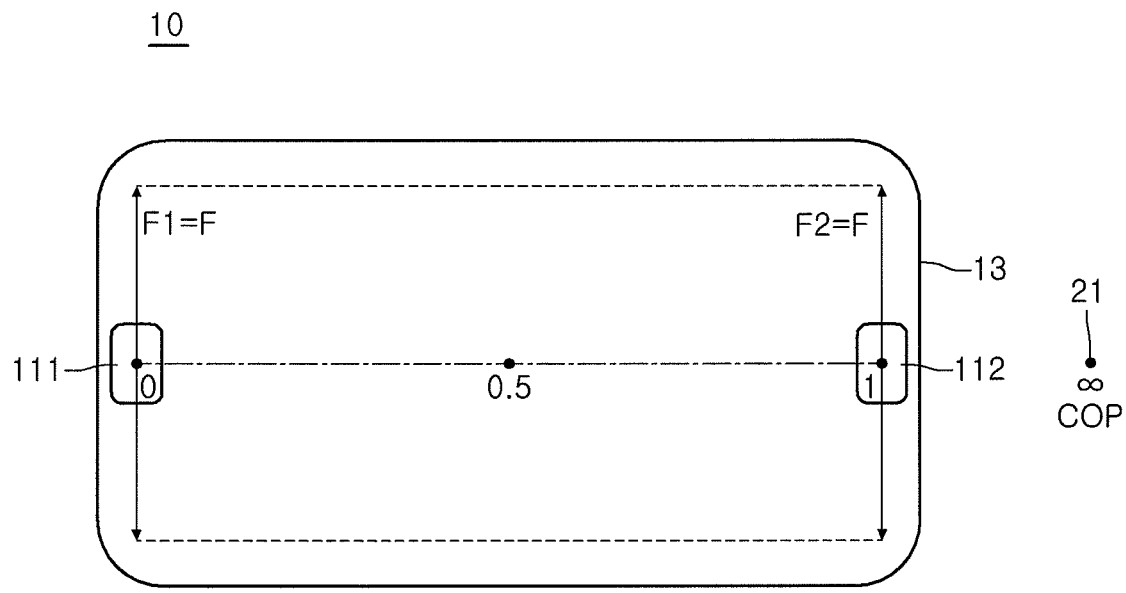
FIGS. 4A to 4I are views illustrating examples of operations of a vibration pattern generation unit according to an embodiment of the invention.

Referring to FIG. 4A, the plurality of oscillators 111 and 112, e.g., the two oscillators 111 and 112 are disposed on predetermined positions, e.g., at both ends of the vibration transfer part 13 according to an embodiment of the invention. The oscillators 111 and 112 may be disposed facing each other.

For convenience, in a straight line connecting the two oscillators 111 and 112, i.e., the first oscillator 111 and the second oscillator 112 to each other, a coordinate of a point at which the first oscillator 111 is disposed is defined as zero, a coordinate of a point at which the second oscillator 112 is disposed is defined as 1, and a middle point coordinate of the points at which the first and second oscillators 111 and 112 are disposed is defined as 0.5.

Also, an intensity of the vibration generated by the first oscillator 111 is defined as F1, and an intensity of the vibration generated by the second oscillator 112 is defined as F2. When the vibration is out-of-phase or opposite phase, the phase of the corresponding vibration is expressed by adding a symbol '−' (i.e., minus). Reference to an out-of-phase vibration includes a vibration that of a different phase, such as a vibration that is off-phase or a vibration that is of an opposite phase.

According to an embodiment of the invention, the control unit 17 may fix an intensity and phase of a vibration generated by one oscillator and reduce an intensity of a vibration generated by the other oscillator to approach or locate the vibration minimum point 21 nearer to the one oscillator.

For example, as shown in FIGS. 4A to 4E, the control unit 17 may fix the intensity F1 and phase of the vibration generated by the first oscillator 111 and reduce the intensity of the vibration generated by the second oscillator 112 to approach the vibration minimum point 21 to the first oscillator 111 or to move or relocate the vibration minimum point 21 closer to or approach the first oscillator 111.

That is, as shown FIG. 4A, the control unit 17 may set the intensities F1 and F2 and phases of the vibrations generated by the first and second oscillators 111 and 112 to the same value (F1=F2=F). In this case, the vibration minimum point 21 of the vibration transfer part 13 is disposed at a position spaced an infinite distance from the second oscillator 112. That is, a coordinate of the vibration minimum point 21 is infinite (∞) in the straight line connecting the first oscillator 111 to the second oscillator 112. This is done because since the two oscillators 111 and 112 apply an external force to the vibration transfer part 13 with the same intensity and phase, a vibration minimum point that is not affected by the vibration does not exist.

In this instance, the control unit 17 may fix the intensity and phase of the vibration generated by the first oscillator 111 and reduce the intensity of the vibration generated by the second oscillator 112 to approach the vibration minimum point 21 to the first oscillator 111.

Figure 4B:
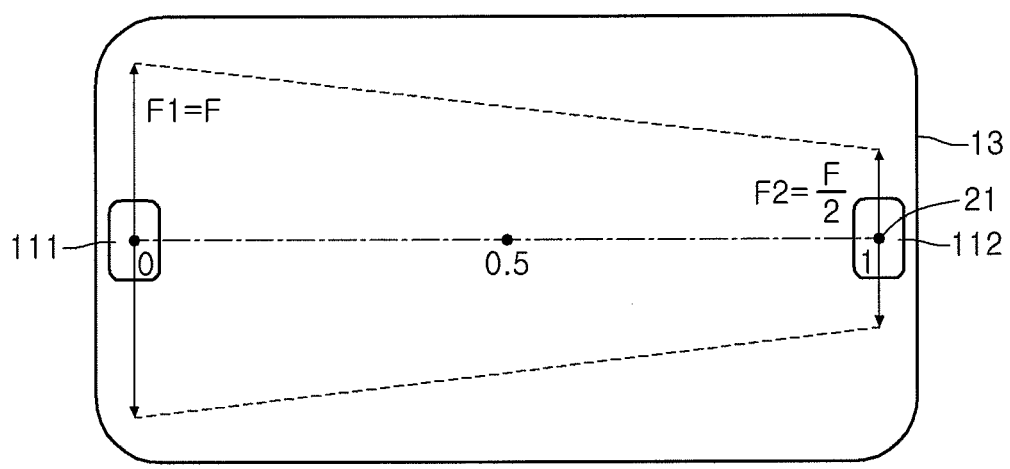

For example, as shown in FIG. 4B, the vibration intensity of the second oscillator 112 may be reduced by a half of that of FIG. 4A (F2=F/2) to move the vibration minimum point 21 from the coordinate ∞ to the coordinate 1 that is the point at which the second oscillator 112 is disposed. As a result, the vibration minimum point 21 may be moved toward the first oscillator 111 that is an oscillator in which the vibration is fixed.

The control unit 17 may further reduce the vibration intensity of the second oscillator 112 to further approach the vibration minimum point 21 toward the first oscillator 111.

Figure 4C:
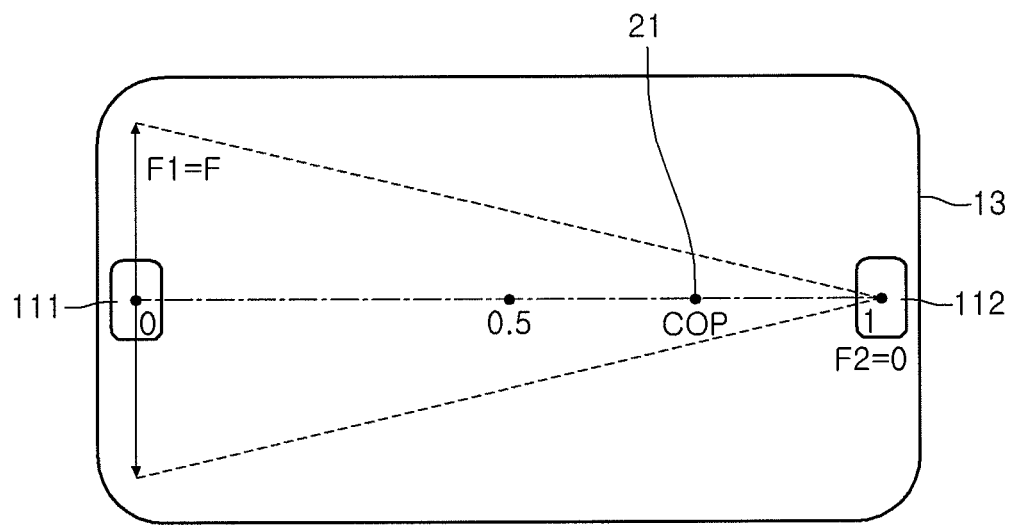
Figure 4D:
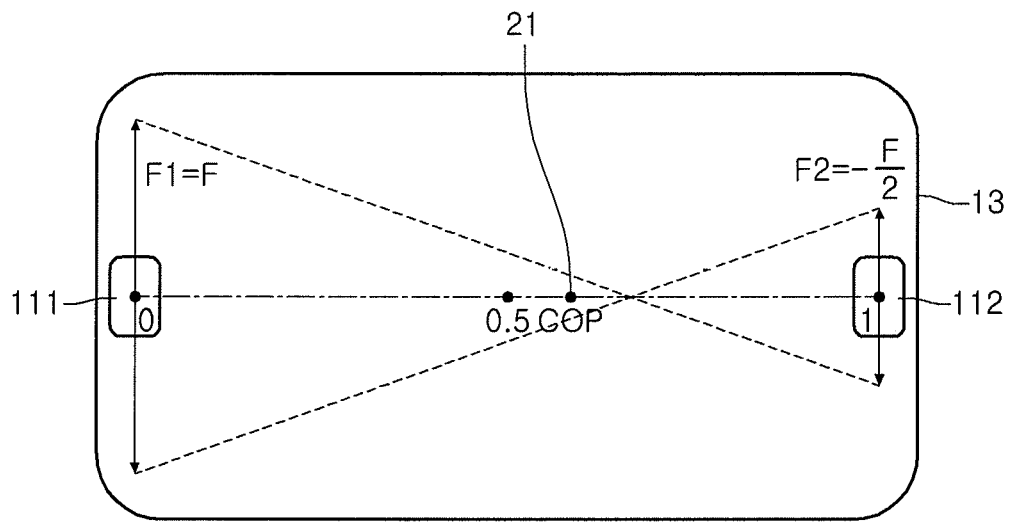
Figure 4E:
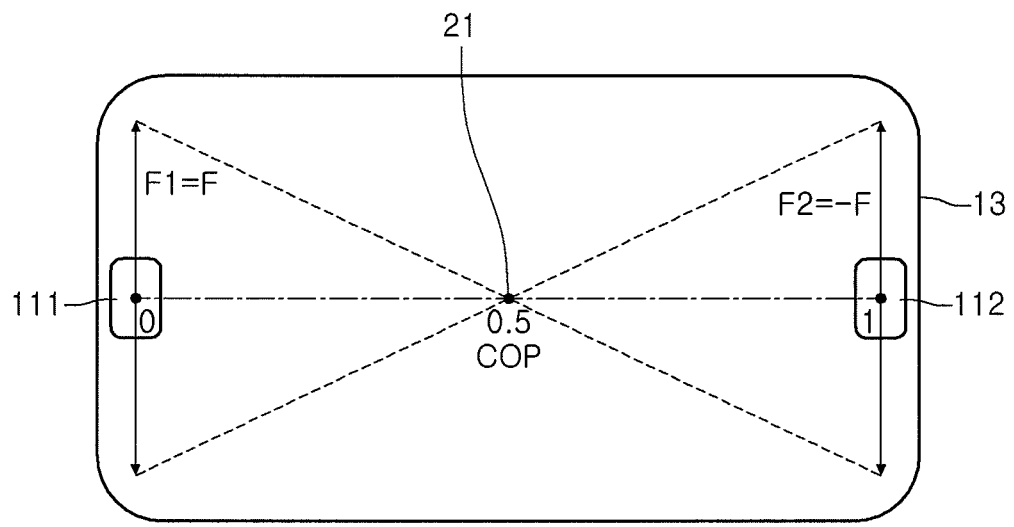

For example, as shown in FIG. 4C, when the control unit 17 controls the vibration of the second oscillator 112 to zero (F2=0), i.e., when the vibration of the second oscillator 112 is stopped, the vibration minimum point 21 further approaches a left side of the coordinate 1, i.e., the point at which the first oscillator 111 is disposed.

Also, when the control unit 17 further reduces the vibration intensity of the second oscillator 112, i.e., when the vibration having an out-of-phase is generated (F2=−F/2), the vibration minimum point 21 may further approach the point at which the first oscillator 111 is disposed.

When the control unit 17 controls the vibration of the second oscillator 112 such that the second oscillator 112 has the same intensity as the first oscillator 111 and a phase opposite to the first oscillator (F1=−F2), the vibration minimum point 21 of the vibration transfer part 13 may be disposed at a middle portion between the point at which the first oscillator 111 is disposed and the point at which the second oscillator 112 is disposed.

In this instance, when the vibration of the second oscillator 112 is fixed and the vibration of the first oscillator 111 is varied, the vibration minimum point 21 may further approach the first oscillator 111.

Figure 4F:
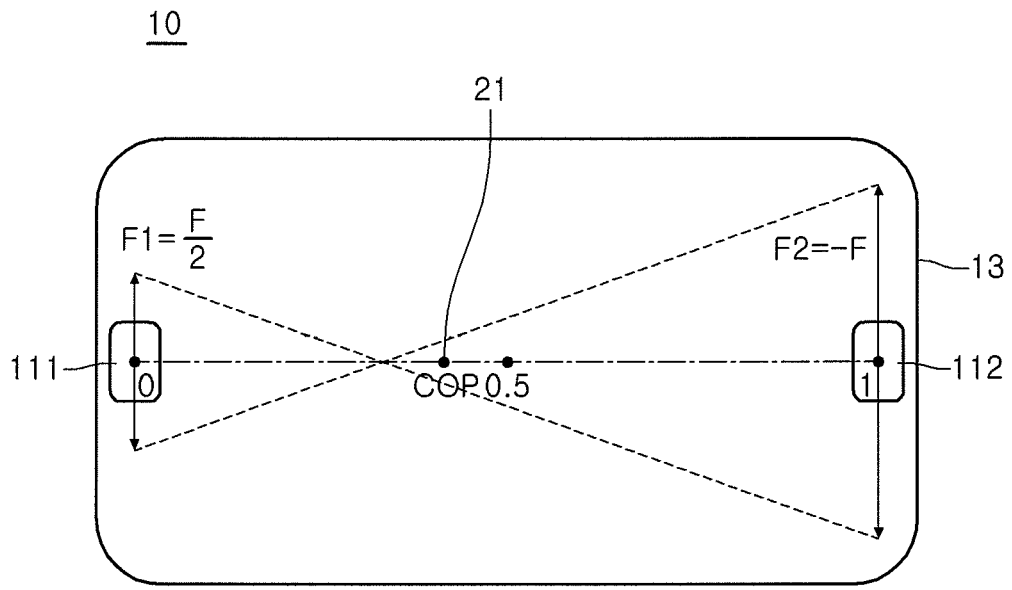

For example, as shown in FIG. 4F, when the vibration of the second oscillator 112 is fixed to −F (F2=−F) and the vibration intensity of the first oscillator 111 is reduced, the vibration minimum point 21 may pass through the coordinate 0.5 to further approach the coordinate zero at which the first oscillator 111 is disposed.

Figure 4G:
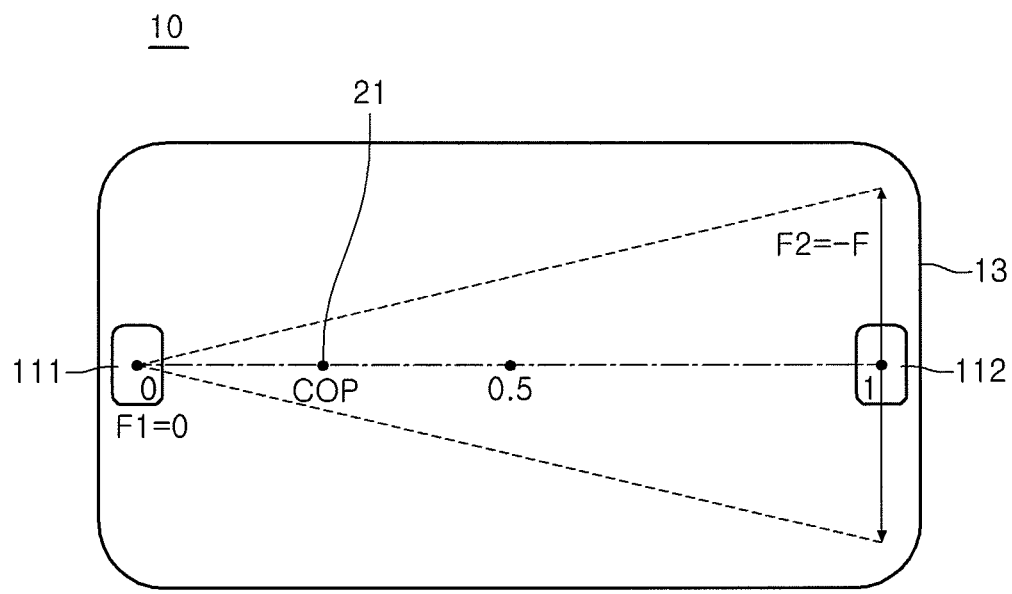

Furthermore, as shown in FIG. 4G, when the control unit 17 controls the vibration of the first oscillator 111 to zero (F1=0), the vibration minimum point 21 may further approach the coordinate zero at which the first oscillator 111 is disposed.

Figure 4H:
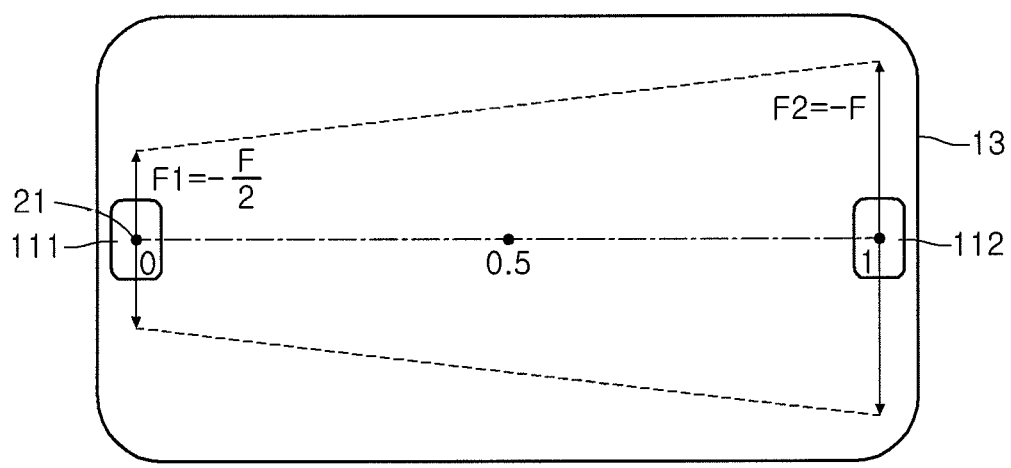
Figure 4I:
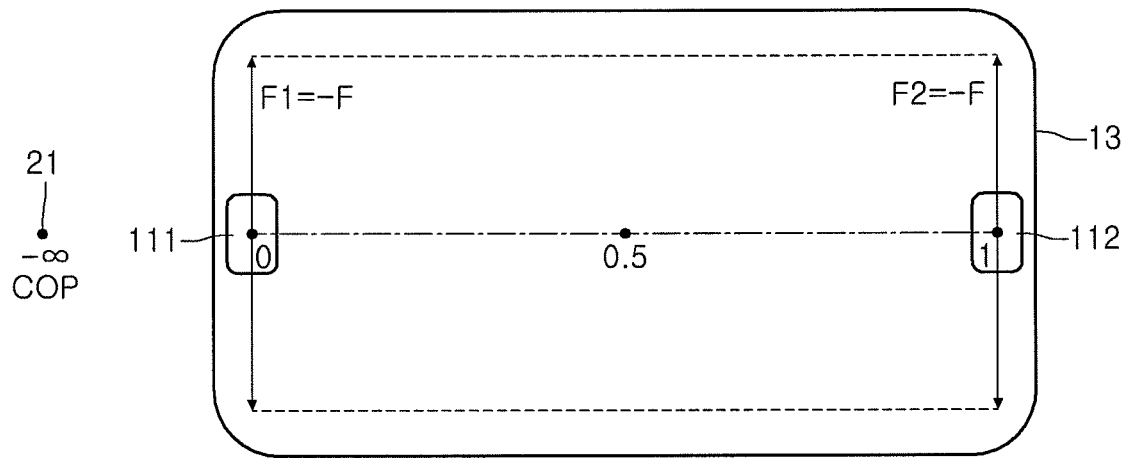

Also, as shown in FIG. 4H, when the control unit 17 further reduces the vibration intensity of the first oscillator 111, i.e., when the vibration having an out-of-phase is generated, the vibration minimum point 21 may further approach the point at which the first oscillator is disposed. That is, the vibration minimum point 21 is disposed at a point equal to that at which the first oscillator 111 is disposed.

In this instance, when the vibration intensity of the first oscillator 111 is further reduced to match the vibration intensity and phase of the first oscillator 111 with the intensity and phase of the second oscillator 112 having the out-of-phase, the vibration minimum point 21 is moved away from the first oscillator 111 and then disposed at the coordinate −∞.

As described above, the control unit 17 may control the intensity and phase of the vibration generated by each of the plurality of oscillators 111 and 112 disposed on the vibration transfer part 13 to move the vibration minimum point of the vibration transfer part 13.

Although the vibration intensity of one oscillator 112 is reduced to move the vibration minimum point 21 closer to the other oscillator 111 in FIGS. 4A-4I, the embodiment of the invention is not limited thereto. For example, on the other hand, the vibration intensity of one oscillator 112 may increase to move the vibration minimum point 21 closer to the one oscillator 112.

Also, as shown in FIGS. 4A-4I, the intensities and phases of the vibrations generated by all oscillators may be controlled by controlling only a few of the oscillators, to move the vibration minimum point 21.

For example, as shown in FIGS. 4A-4I, when the vibration intensities of two oscillators are changed rather than a change of a vibration intensity of only one oscillator, a movement speed of the vibration minimum point 21 may increase.

Unlike a related art, in a vibration pattern generation unit 10 according to an embodiment of the invention, the simple change of the intensity and frequency of the generated vibration may be further developed to realize a dynamically moving vibration effect of the vibration within the oscillator 11. Accordingly, the oscillator 111 may vary a frequency/resonance, intensity, a phase, or a combination thereof, of a generated vibration.

Although the vibration minimum point 21 is explained as a point at which the rotation or vibration is minimally generated or does not occur due to a minimized effect by the external force when the external force is applied to the object, a user may feel the vibration from the vibration minimum point 21 in case where the user holds the vibration pattern generation unit 10 according to this embodiment of the invention.

As a result, when the vibration minimum point 21 is moved, the user may feels the vibration generated by the oscillator 111 as if the oscillator 111 is moved within the vibration pattern generation unit 10. When a position, a movement speed, a vibration intensity, a phase, a frequency, or a combination thereof, for the vibration minimum point 21 are variously changed, the vibration effect having various and unique feeling or sensation may be provided to the user. Accordingly, a change in at least one of a position, a movement speed, a vibration intensity, a phase, a frequency, or a combination thereof, for the vibration minimum point 21 is changed so that the user is able to sense or feel the change or the vibration at or about the vibration minimum point 21, in a localized manner.

According to an embodiment of the invention, the control unit 17 may control such that the vibration minimum point 21 is sequentially moved from one point to the other point of the vibration transfer part 13.

FIGS. 5A to 5D are views illustrating examples of movements of the vibration minimum point 21 according to embodiments of the invention.

Figure 5A:
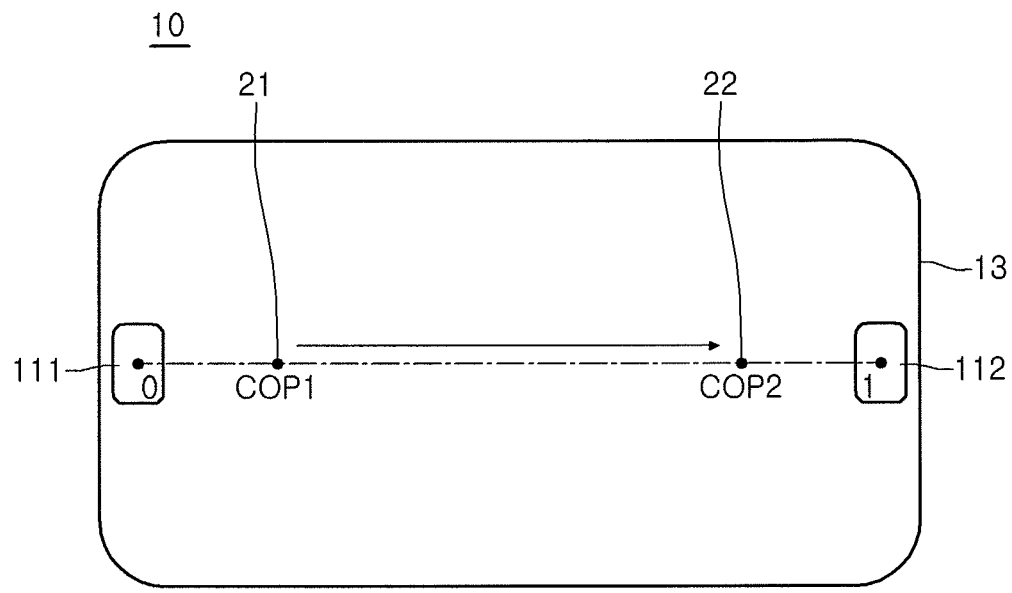
FIGS. 5A to 5D are views illustrating examples of movements of a vibration center according to an embodiment of the invention.

Referring to FIG. 5A, the control unit 17 may control the intensity and phase of the vibration generated by the respective oscillators 111 and 112 to sequentially move the vibration minimum point 21 from one point 21' to another point 22' of the vibration transfer part 13.

For example, the control unit 17 may sequentially perform the above-described processes of FIGS. 4A to 4I to realize the sequential movement of the vibration minimum point 21.

For this, the control unit 17 may control the driving part 12 to sequentially change an amplitude or phase of a driving power applied to the oscillators 111 and 112.

According to another embodiment of the invention, the control unit 17 may control such that that the vibration minimum point 21 is discretely, smoothly or continuously moved from one point to another point of the vibration transfer part 13.

Figure 5B:
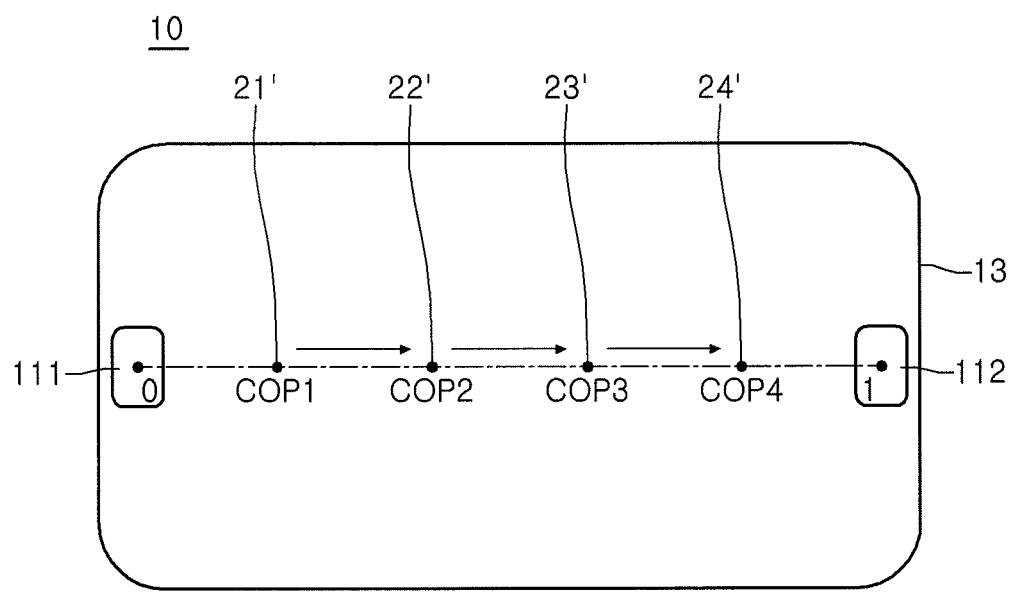

Referring to FIG. 5B, the control unit 17 may control an amplitude or phase of the vibration generated by the respective oscillators 111 and 112 to discretely move the vibration minimum point 21 from one point 21' to the other point 24'.

For example, the control unit 17 may control such that the vibration minimum point 21 is discretely or smoothly moved via the first point 22' and the second point 23' without being sequentially moved from the one point 21' to the another point 24'.

According to another embodiment of the invention, the control unit 17 may control such that the vibration minimum point 21 is randomly moved to a certain point of the vibration transfer part 13.

Figure 5C:
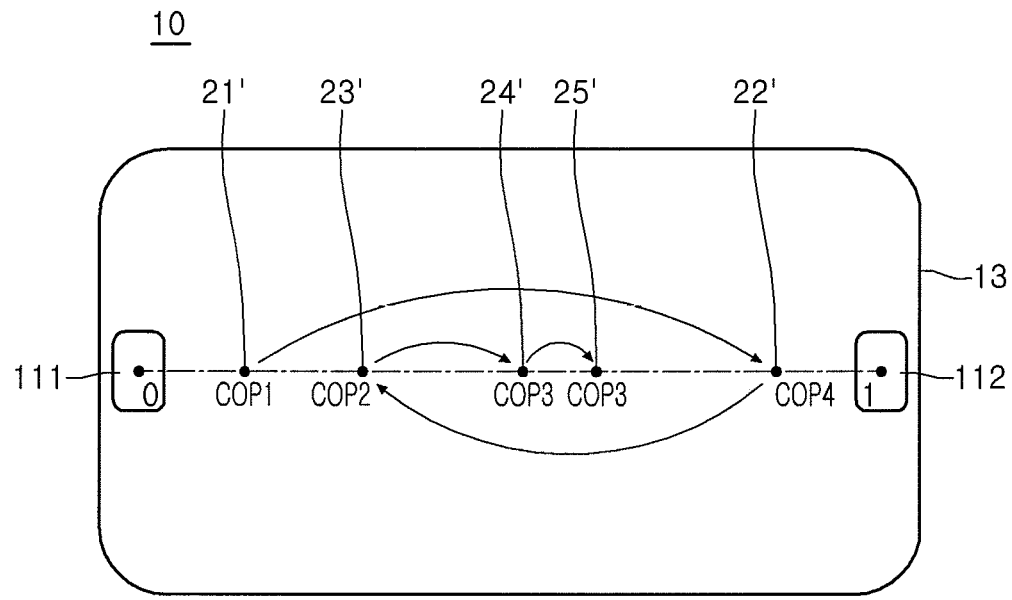

Referring to FIG. 5C, the control unit 17 may control such that the vibration minimum point 21 is randomly moved to certain points 21', 22', 23', 24', and 25' without being sequentially or discretely moved from one point 21' to the yet another point 25'.

According to an embodiment of the invention, the control unit 17 may set the vibrations generated by the plurality of oscillators 111 and 112 to the same vibration frequency and waveform.

That is to say, although the intensities and phases of the vibrations generated by the plurality of oscillators 111 and 112 are sequentially, discretely, or irregularly changed to move the vibration minimum point 21, the vibrations generated by the plurality of oscillators 111 and 112 may be set to the same vibration frequency and waveform.

This is done because the movement of the vibration minimum point 21 may be precisely controlled in case where the vibration frequencies and waveforms of the oscillators 111 and 112 match each other.

The control unit 17 may change the vibration frequencies and waveforms of the plurality of oscillators 111 and 112 according to a time variation. That is, the plurality of oscillators 111 and 112 have the same vibration frequency and waveform, but may come to have different values according to the time variation or may be changed over time.

Although the two oscillators 111 and 112 are disposed on the vibration transfer part 13 in FIGS. 4A to 4I and 5A to 6C, the embodiment of the invention is not limited thereto. For example, in the vibration pattern generation unit 10, two or more, e.g., three or four oscillators 111, 112, 113, and 114 may be disposed on the vibration transfer part 13.

Figure 5D:
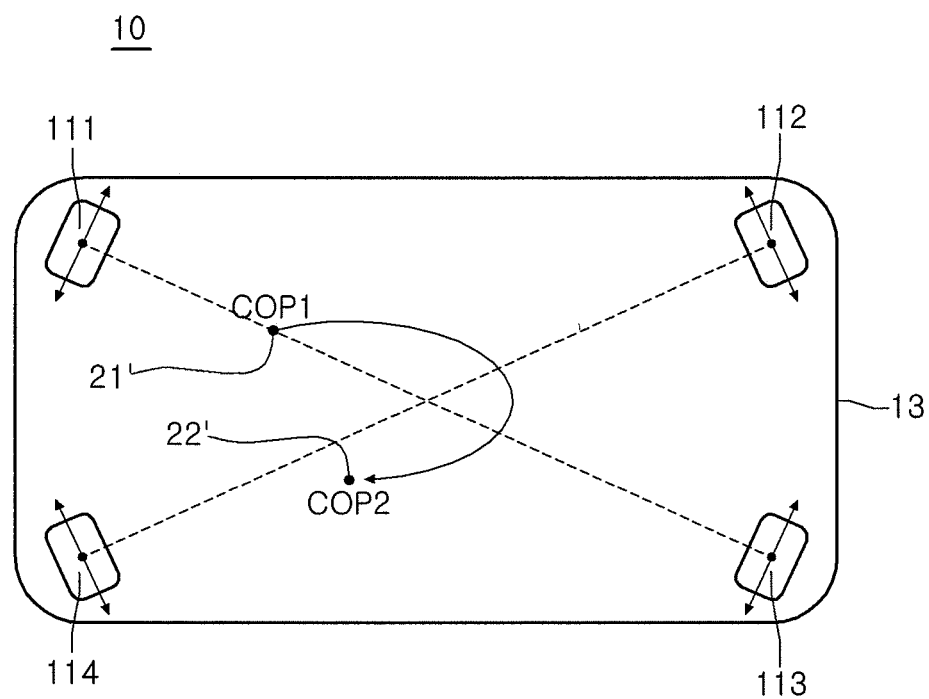

FIG. 5D is a view illustrating an example of the movement of the vibration minimum point 21 of the vibration transfer part 13 on which four oscillators 111, 112, 113, and 114 are disposed according to another embodiment of the invention.

The vibration minimum point 21 of FIGS. 4A to 4I and 5A to 5C is linearly moved on the straight line connecting the first oscillator 111 to the second oscillator 112. However, as shown in FIG. 5D, when three or more oscillators are provided, particularly, when four oscillators are provided, the vibration minimum point 21 may be planarly moved on a plane formed by the four oscillators 111, 112, 113, and 114. Thus, the vibration minimum point 21 may be moved with various degrees of freedom.

For example, vibrations of the first oscillator 111 and the third oscillator 113 facing the first oscillators 111 are fixed to dispose the vibration minimum point on a straight line connecting the first oscillator 111 to the third oscillator 113. Then, the vibration intensity of the second oscillator 112 may increase to allow the vibration minimum point to approach the second oscillator 112.

On the other hand, a vibration intensity of the fourth oscillator 114 may increase to allow the vibration minimum point to approach the fourth oscillator 114.

Also, two or more oscillators among the four oscillators 111, 112, 113, and 114 may be simultaneously controlled to move the vibration minimum point 21.

According to an embodiment of the invention, the respective oscillators 111 and 112 may be a multi-channel oscillator that generates a vibration having at least two vibration frequencies.

Hereinafter, an oscillator according to an embodiment of the invention will be described in detail with reference to FIGS. 6A to 6D.

Figure 6A:
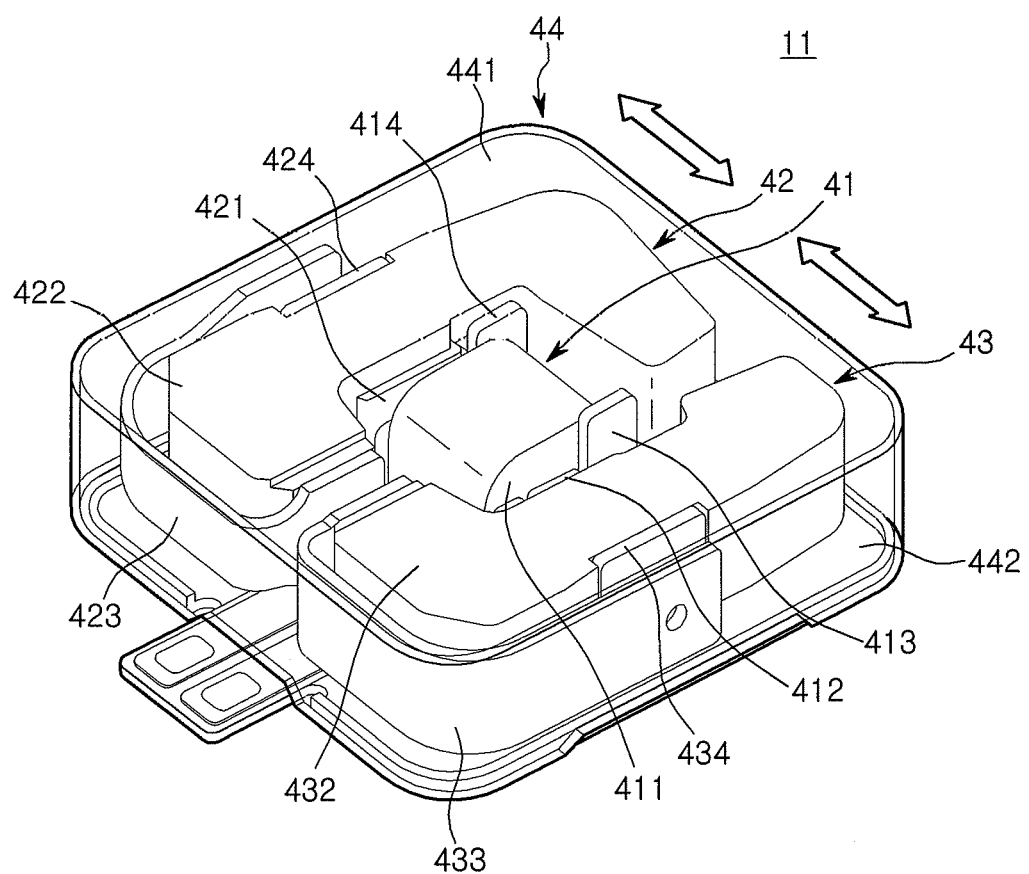
FIGS. 6A to 6C are a perspective view, an exploded perspective view, and a plan view of an oscillator according to an embodiment of the invention, respectively.
Figure 6B:
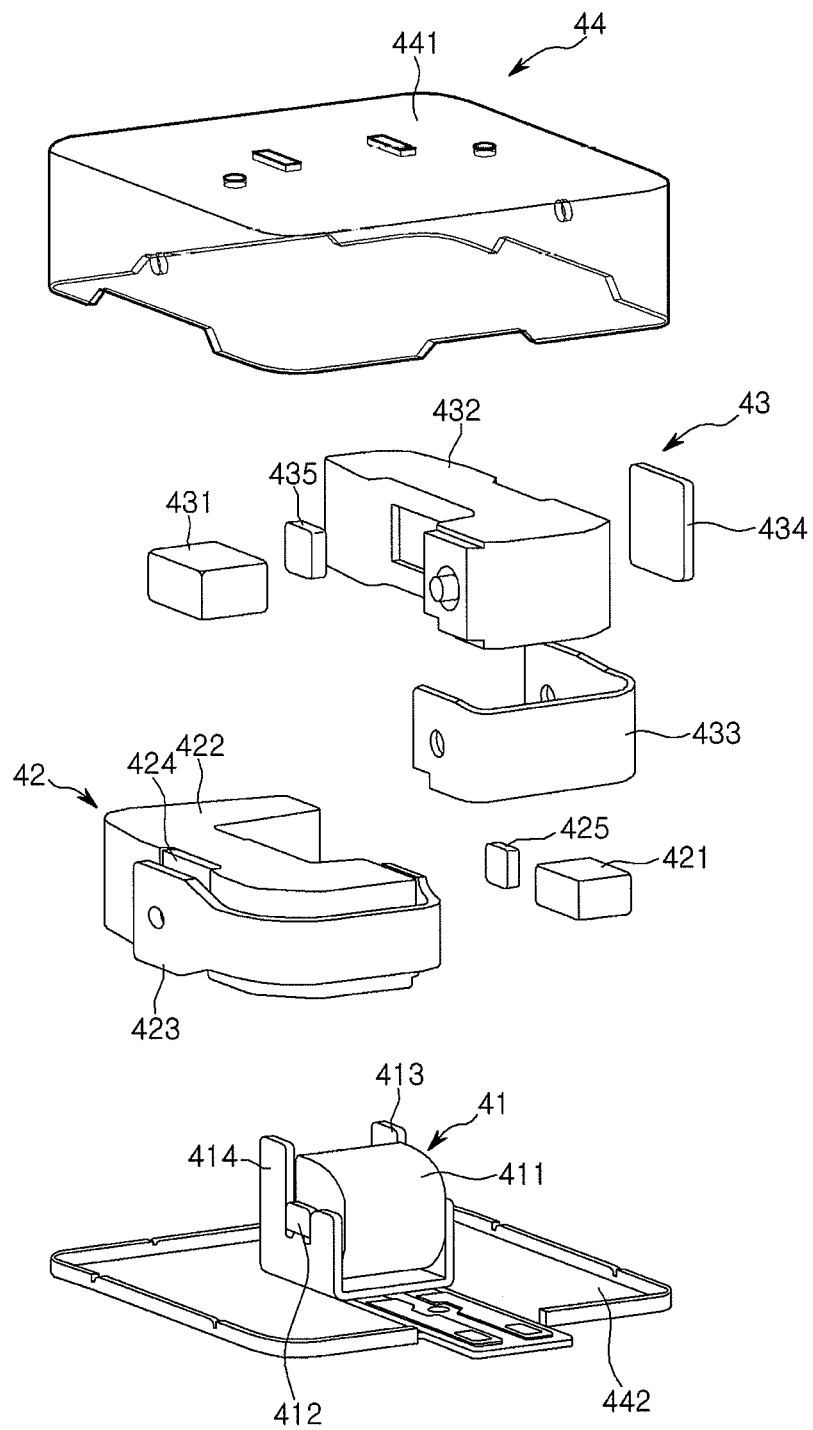
Figure 6C:
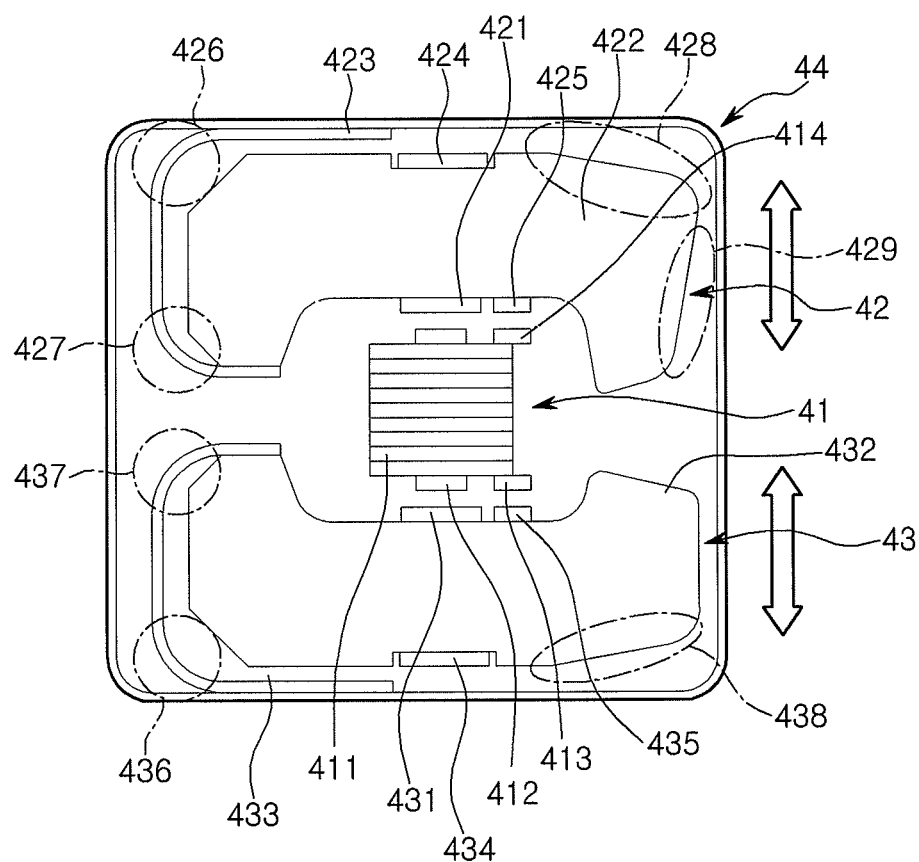

FIGS. 6A to 6C are a perspective view, an exploded perspective view, and a plan view of an oscillator 11 according to an embodiment of the invention, respectively.

Referring to FIGS. 6A to 6D, the oscillator 11 according to an embodiment of the invention includes a magnetic flux generation part 41 generating a magnetic flux, a plurality of vibration generation parts 42 and 43 generating an electromagnetic force by interacting with the magnetic flux and receiving the electromagnetic force to generate a vibration, and a case 44 transferring the vibration to the outside. Also, the plurality of vibration generation parts 42 and 43 shares the magnetic flux generation part 41 and is symmetrically disposed centered about the magnetic flux generation part 41.

The magnetic flux generation part 41 receives a driving power from the outside to generate the magnetic flux. According to an embodiment of the invention, the magnetic flux generation part 41 may include a coil 411 for receiving the driving power to generate the magnetic flux and a core 412 for increasing a magnetic flux density of the magnetic flux.

A thick wire is wound several times around the core 412 to form the coil 411. The core 412 passes through a center of the coil 411. The core 412 may be formed of a material that is easily demagnetized when the driving power that is applied to the coil 411 is interrupted. For example, the core 412 may be a silicon steel or a ferrite core.

When the driving power is applied to the coil 411, a magnetic field line is formed along a direction of current flowing along the coil 411. The direction of the magnetic field line is given by the right hand rule.

According to an embodiment of the invention, the magnetic flux generation part 41 may generate the magnetic flux in a direction parallel to that of a central axis of the coil 411. That is, referring to the plan view of the oscillator 11 illustrated in FIG. 6C, the magnetic flux generation part 41 generates the magnetic flux in a vertical direction. The generated magnetic flux interacts with magnets 421 and 431 disposed on the vibration generation parts 42 and 43 to generate the electromagnetic force, which will be described in detail later.

The vibration generation part 42 and 43 interacts with the magnetic flux generated by the magnetic flux generation part 41 to generate the electromagnetic force and is affected by the electromagnetic force as an external force to generate the vibration.

According to an embodiment of the invention, the vibration generation parts 42 and 43 respectively may include the magnets 421 and 431 in which positive poles are disposed on the central axis of the coil, weights 422 and 432 in which the magnets 421 and 431 are respectively attached to surfaces thereof and increase a vibration amount of the generated vibration, and elastomers 423 and 433 having one end attached to the case 44 and the other end attached to the weights 422 and 432 and including two bending (or bent) portions between the one end and the other end.

N-poles and S-poles, which are positive poles, of the magnets 421 and 431 are disposed on the central axis of the coil 411. That is, the magnets 421 and 431 and the magnetic flux generation part 41 are disposed on a straight line. The N-poles and S-poles of the magnets 421 and 431 may be disposed all on the central axis of the coil 411. Thus, a direction of the magnetic field line generated by the magnetic flux generation part 41 may be equal to or parallel to that of the magnetic field line generated by the magnets 421 and 431.

Thus, the magnets 421 and 431 may interact with the magnetic flux generated by the magnetic flux generation part 41 to generate the electromagnetic force. The generated electromagnetic force may act as an attractive force or a repulsive force according to the disposition of both poles of the magnets 421 and 431, the direction of the current flowing along the coil 411, and a direction in which the coil 411 is wound around the core 412.

The magnets 421 and 431 are attached to the surfaces of the weights 422 and 432, respectively. Thus, the weights 422 and 432 may be affected by the electromagnetic force generated by interaction between the magnets 421 and 431 and the magnetic flux generation part 41 as the external force.

The weights 422 and 432 are attached to ends of the elastomers 423 and 433 to generate an oscillatory motion. That is, the weights 422 and 432 may serve as masses in the oscillatory motion using the elastomers 423 and 433. Also, the weights 422 and 432 may adjust the vibration amount of the generated vibration according to masses and configurations of the weights 422 and 432.

The weights 422 and 432 may occupy a remaining space other than a space occupied by the magnetic flux generation part 41 within the case 44. However, a spare space required for the oscillatory motion of the weights 422 and 432 should be secured between the weights 422 and 432 and the case 44 and between the weights 422 and 432 and the magnetic flux generation part 41.

According to an embodiment of the invention, surfaces of the weights 422 and 432 facing a surface of the case 44 are not parallel to the surface of the case 44 and inclined with respect to the surface of the case 44.

That is, as shown in FIG. 6C, surfaces 428, 429, and 438 of the weights 422 and 432 facing the surface of the case 44 may not be parallel to the surface of the case 44 and may be inclined with respect to the surface of the case 44. As a result, when the weights 422 and 432 perform the oscillatory motion, the weights 422 and 432 may not collide with the case 44 and may be vibrated with maximum amplitudes.

A degree of the inclination of the surfaces of the weights 422 and 432 with respect to the surface of the case 44 may be determined according to the maximum amplitudes of the weights 422 and 432. For example, as the maximum amplitudes of the weights 422 and 432 increase, the inclination of the surfaces 428, 429, and 438 of the weights 422 and 432 increase. On the other hand, as the maximum amplitudes of the weights 422 and 432 decrease, the inclination of the surfaces 428, 429, and 438 of the weights 422 and 432 decrease.

The elastomers 423 and 433 respectively have one ends attached to the case 44 and the other ends attached to the weights 422 and 432.

Figure 6D:
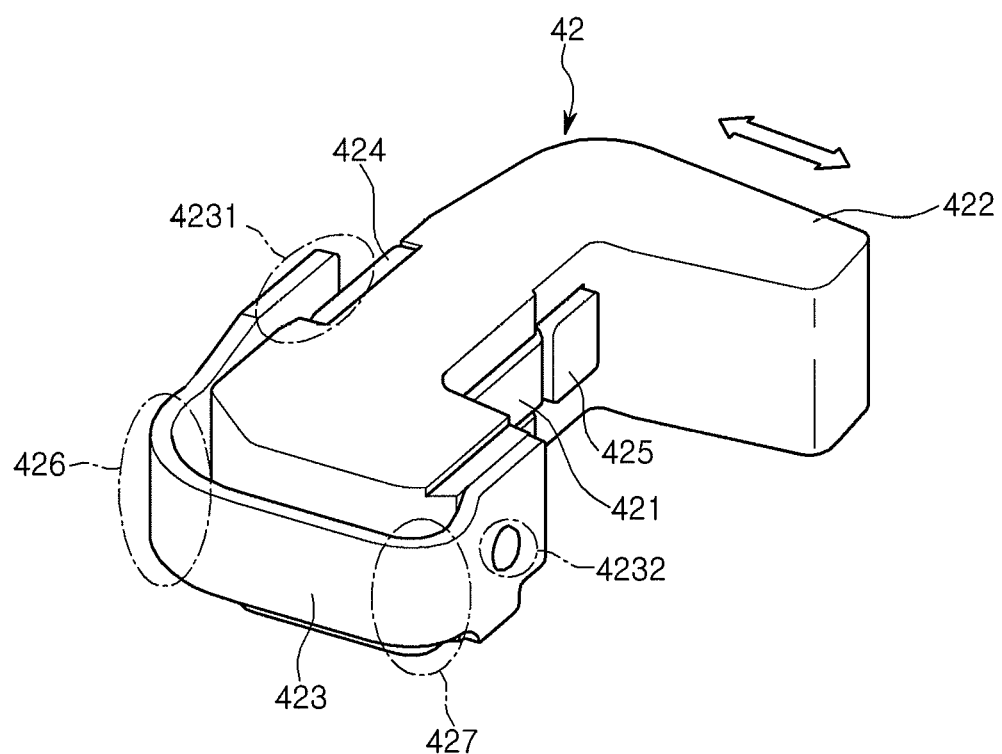
FIG. 6D is a perspective view illustrating a vibration generation part of an oscillator according to an embodiment of the invention.

FIG. 6D is a perspective view illustrating the vibration generation part 42 of the oscillator 11 according to an embodiment of the invention.

As shown in FIG. 6D, the elastomer 423 has one end 4231 attached to the case 44 and the other end 4232 attached to the weight 422. As a result, the elastomer 423 is affected by the generated electromagnetic force as an external force to apply a restoring force to the weight 422. That is, the weight 422 may perform the oscillatory motion using the generated electromagnetic force and the restoring force supplied from the elastomer 423.

According to an embodiment of the invention, the elastomers 423 and 433 may be leaf springs or coil springs. When the elastomers 423 and 433 include the leaf springs, the elastomers 423 and 433 include two bending portions between the one end and the other end.

That is, as shown in FIG. 6D, the elastomer 423 may include the two bending portions 426 and 427 between the one end 4231 and the other end 4232. As a result, the elastomer 423 and 433 may have a U-shape on the whole.

As described above, since the oscillator 11 includes the elastomers 423 and 433 including the two bending portions 426 and 427, a stress with respect to the weights 422 and 432 may not be concentrated into a point to which the case 44 and the elastomers 423 and 433 are attached, e.g., the reference numeral 4231 of FIG. 6D and thus may be distributed in a region between the two bending portions 426 and 427 even through the weights 422 and 432 are repeatedly vibrated.

Thus, even through the weights 422 and 432 are repeatedly vibrated, fatigue does not occur at the point to which the case 44 and the elastomers 423 and 433 are attached. Thereafter, it may prevent or reduce the vibration amount or a resonance frequency of the vibration generation parts 42 and 43 from being reduced or changed.

The bending portions 426 and 427 may be vertically bent.

According to an embodiment of the invention, yokes 424 and 434 may be further attached to the weights 422 and 432. The yokes 424 and 434 set a path of the magnetic flux generated by the magnetic flux generation part 41.

The yokes 424 and 434 may be attached to the other surface, that is, a surface opposite to that to which the magnets 421 and 431 are attached on the weights 422 and 432. That is, referring to FIG. 6C, the magnets 421 and 431 may face the yokes 424 and 434 with the weights 422 and 432, respectively, therebetween. The yokes 424 and 434 may be formed of iron or nickel that is a ferromagnetic material.

Also, the case 44 may be formed of a ferromagnetic material to further set a path of the magnetic flux generated by the magnetic flux generation part 41. Thus, by the yokes 424 and 434 and the case 44 formed of ferromagnetic material, the magnetic flux generated by the magnetic flux generation part 41 may be formed in a central axis direction of the coil 411.

According to an embodiment of the invention, the magnetic flux generation part 41 may further include vibration stopping parts 413 and 414 for restricting a vibration amplitude of the respectively vibration generation parts 42 and 43.

The vibration stopping parts 413 and 414 may restrict the vibration amplitude using a distance between the weights 422 and 432 and the magnetic flux generation part 41 in case where the vibration amplitude is greater than the distance between the weights 422 and 432 and the magnetic flux generation part 41 as the weights 422 and 432 perform the oscillatory motion.

According to an embodiment of the invention, the vibration generation parts 42 and 43 may further include buffer parts 425 and 435 for decreasing noise generated by the contact of the vibration stopping parts 413 and 414.

The buffer parts 425 and 435 may be attached to a point on the weights 422 and 432 contacting the vibration stopping parts 413 and 414, to decrease the noise generated by the contact of the weights 422 and 432. The buffer parts 425 and 435 may be formed of resin, rubber, or foam that is a material for buffering an impact due to collision.

According to an embodiment of the invention, the vibration generation parts 42 and 43 may have a symmetric structure to face each other within the case 44. That is, the vibration generation parts 42 and 43 may be symmetrically disposed centered about the magnetic flux generation part 41. In this case, an inner space of the case 44 may be effectively usable.

According to an embodiment of the invention, the plurality of vibration generation parts 42 and 43 may share the one magnetic flux generation part 41. As described above, the plurality of vibration generation parts 42 and 43 may be symmetrically disposed centered about the one magnetic flux generation part 41 to share the magnetic flux generated by the one magnetic flux generation part 41.

Thus, the respective vibration generation parts 42 and 43 may not necessarily include the magnetic flux generation parts different from each other. Thus, since one magnetic flux generation part 41 may be provided to realize a more small-sized case 44.

According to an embodiment of the invention, since the vibration generation parts 42 and 43 included in the oscillator 11 have resonance frequencies different from each other, the oscillator 11 may be a multi-mode vibration generation unit. The resonance frequencies of the vibration generation parts 42 and 43 may be determined according to configurations, sizes, and masses of the elastomers 423 and 433, the weights 422 and 432, the magnets 421 and 431, and yokes 424 and 434.

When the vibration generation parts 42 and 43 have the resonance frequencies different from each other, whether the vibration generation parts 42 and 43 are vibrated may be determined according to a frequency of the driving power applied to the magnetic flux generation part 41.

For example, in FIG. 6C, a resonance frequency of the upper vibration generation part 42 is defined as f1, and a resonance frequency of the lower vibration generation part 43 is defined as f2.

When a frequency of the driving power applied to the magnetic flux generation part 41 is f1, the upper vibration generation part 42 is resonant and vibrated in a vertical direction of FIG. 6C. However, the lower vibration generation part 43 is not vibrated or is vibrated very little due to mismatch of the resonance frequency.

On the other hand, when the frequency of the driving power applied to the magnetic flux generation part 41 is f2, the upper vibration generation part 42 is not vibrated or is vibrated very little. However, the lower vibration generation part 43 may be resonant and vibrated in the vertical direction of the FIG. 6C.

When the frequency of the driving power applied to the magnetic flux generation part 41 is f3, but not f1 or f2, all of the vibration generation parts 42 and 43 are not vibrated or are vibrated very little.

When the frequency of the driving power applied to the magnetic flux generation part 41 is a resultant wave of f1+f2, all of the vibration generation parts 42 and 43 may be resonant and vibrated to generate the vibration.

According to another embodiment of the invention, the vibration generation parts 42 and 43 may have the same resonance frequency. In this case, when the frequency of the driving power applied to the magnetic flux generation part 41 matches the resonance frequency, all of the vibration generation parts 42 and 43 are resonant and vibrated to increase the vibration amount to twice.

Thus, the oscillator 11 may realize a multi-mode vibration because the vibration generation parts 42 and 43 have resonance frequencies different from each other. In addition, the vibration amount may be increased to twice due to the same resonance frequency.

Also, the oscillator 11 may be realized in various shapes.

Figure 7A:
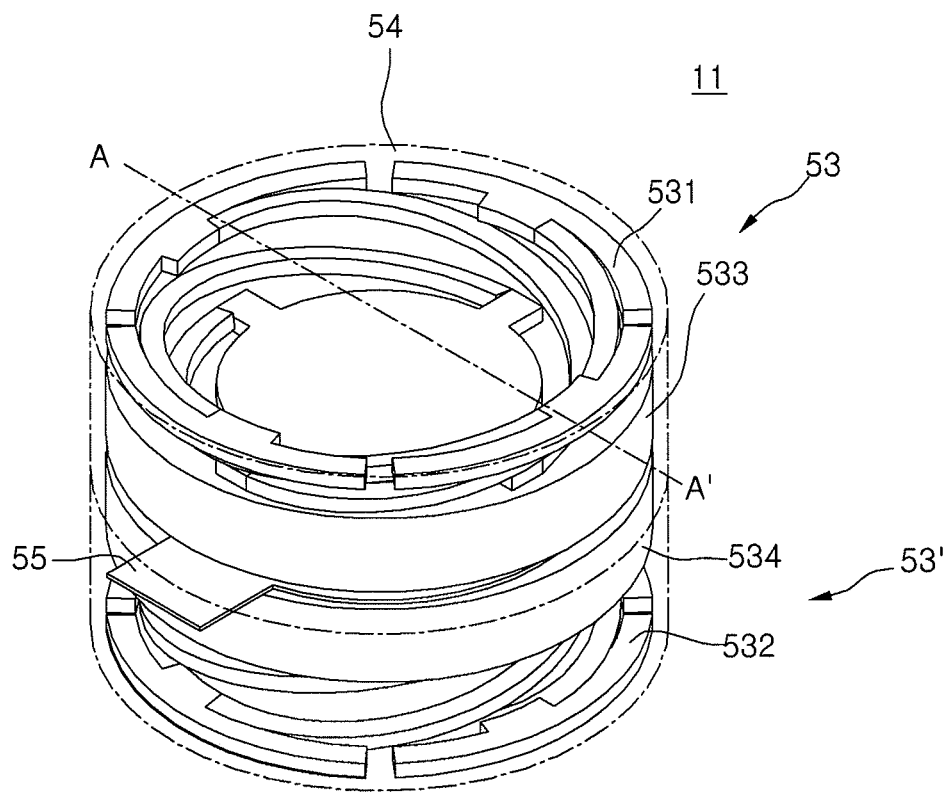
FIGS. 7A and 7B are an assembled perspective view and an exploded perspective view of an oscillator according to another embodiment of the invention.
Figure 7B:
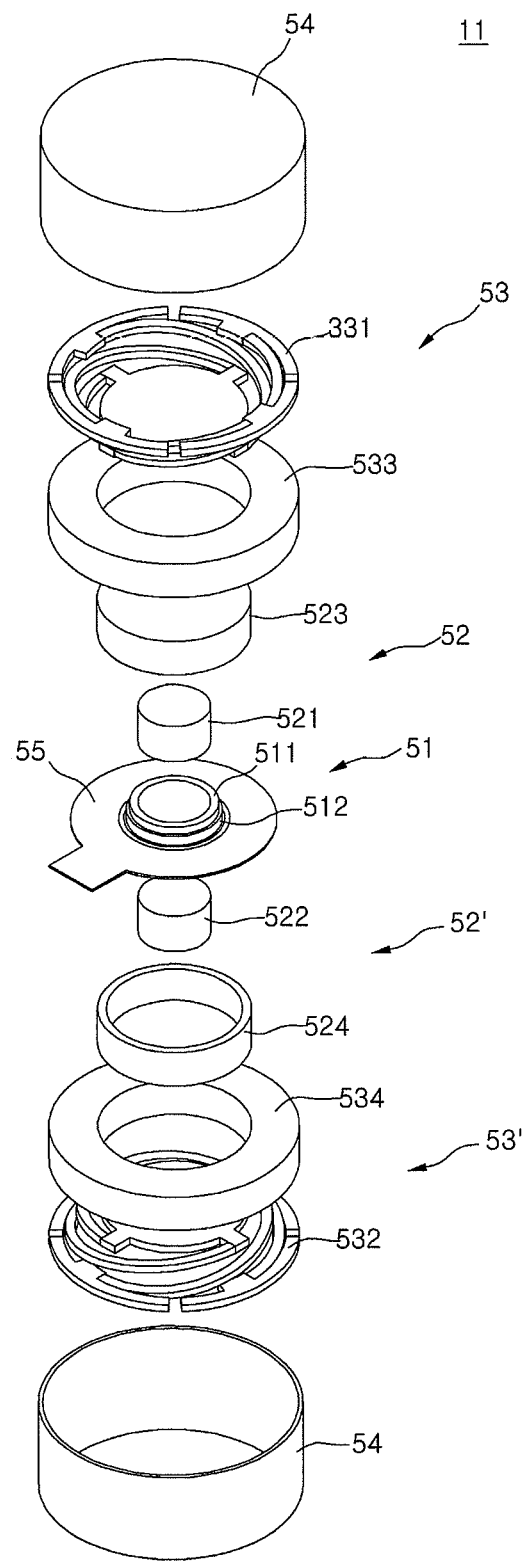

FIGS. 7A and 7B are an assembled perspective view and an exploded perspective view of an oscillator 11 according to another embodiment of the invention.

Referring to FIGS. 7A and 7B, the oscillator 11 according to another embodiment of the invention includes a coil assembly 51, a plurality of magnet assemblies 52 and 52', a plurality of spring assemblies 53 and 53', and a transfer member 54. The coil assembly 51 forms a magnetic flux when current is applied. The plurality of magnet assemblies 52 and 52' interacts with the coil assembly 51 to generate an electromagnetic force. The plurality of spring assemblies 53 and 53' generates a vibration due to an effect of the electromagnetic force. The transfer member 54 transfers the vibration to the outside. Accordingly, the transfer member 54 acts as a conduit for the vibration. The plurality of magnet assemblies 52 and 52' and the plurality of spring assemblies 53 and 53' share the coil assembly 51.

The coil assembly 51 forms the magnetic flux when the current is applied from the outside. The coil assembly 51 may include a coil part 511 for forming the magnetic flux by the current applied from the outside and a core part for increasing a density of the magnetic flux formed by the coil part 511.

A thick wire is wounded several times around the core part to form the coil part 511. Thus, when the current is applied to the wire, the magnetic flux is formed through the coil part 511. When the applied current is changed, the magnetic flux is changed also to change an intensity of a magnetic field formed around the coil part 511. The core part increases a magnetic flux density of the magnetic flux formed by the coil part 511. The core part is disposed to pass through a center of the coil part 511. The core part may be formed of a material that is easily demagnetized when the driving power applied to the coil part 511 is interrupted. For example, the core part may be silicon steel or a ferrite core.

Figure 7C:
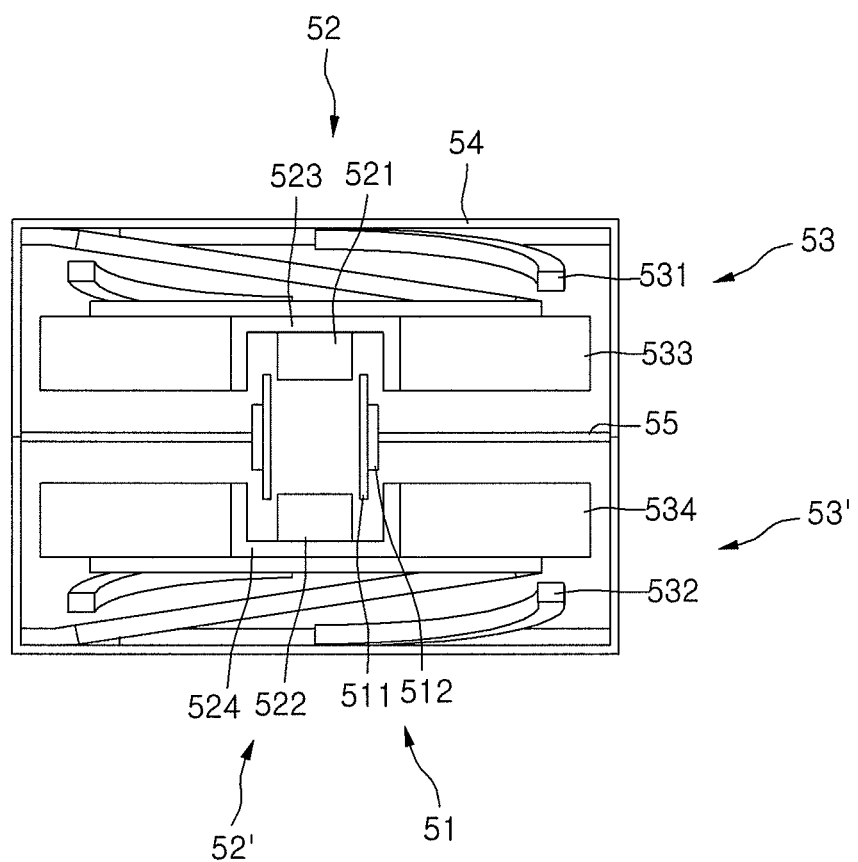
FIG. 7C is a sectional view taken along line A-A' of FIG. 7A.

The coil assembly 51 may form an empty space within the coil part 511 without displacing the core part to secure a space in which the magnet assemblies 52 and 52' are inserted. As shown in FIG. 7C, the coil assembly 51 may include the coil part 511 and a hub 512 for fixing the coil part 511 to a flexible printed circuit (FPC) 55. In this case, the magnetic flux formed by the coil part 511 is reduced when compared to a case in which the core part is disposed.

The FPC 55 provides an electrode for supplying the current applied to the coil part 511. Both ends of the wire constituting the coil part 511 may be connected to each other using soldering to receive the current from the outside.

The magnet assemblies 52 and 52' interact with the coil assembly 51 to generate the electromagnetic force. The magnet assemblies 52 and 52' may include magnet parts 521 and 522 for forming a magnetic field and yoke parts 523 and 524 receiving the magnet parts 521 and 522 and magnetized by the magnet parts 521 and 522 to form an additional magnetic field.

The magnet parts 521 and 522 may be permanent magnets. Also, when power is applied, the magnet parts 521 and 522 may be electromagnets having magnetic properties. The magnet parts 521 and 522 included in the oscillator 11 may be the same number as the number of spring assemblies 53 and 53'. In this case, the spring assemblies 53 and 53' may include the magnet assemblies including the magnet parts 521 and 522, respectively.

The magnetic field generated by the magnetic flux formed by the coil assembly 51 interacts with the magnetic field generated by the magnet assemblies 52 and 52' to generate the electromagnetic force. When the current applied to the coil part 511 is repeatedly turned on/off, the electromagnetic force affecting the magnet assemblies 52 and 52' may be repeatedly generated and vanished to apply an external force to the magnet assemblies 52 and 52'. Alternatively, a direction of the current applied to the coil part 511 may be periodically changed to change a polarity, i.e., an N-pole and an S-pole of the coil assembly 51, thereby applying an attractive force and a repulsive force to the magnet assemblies 52 and 52' to apply the external force. The magnet assemblies 52 and 52' may be fixed to the spring assemblies 53 and 53' to transfer the external force to the spring assemblies 53 and 53'.

The spring assemblies 53 and 53' uses the electromagnetic force generated between the coil assembly 51 and the magnet assemblies 52 and 52' as an external force to generate the vibration. The spring assemblies 53 and 53' may include spring members 531 and 532 receiving the external force and which vibrate and weights 533 and 534 attached to one end of the respective spring members 531 and 532.

The spring members 531 and 532 has the other end attached to the transfer member 54 to transfer the vibration generated by the spring members 531 and 532 to the outside. The spring members 531 and 532 may have the one end attached to the weights 533 and 534 to increase a vibration amount using gravity and an inertial force due to a self-weight of the weights 533 and 534.

The respective weights 533 and 534 have a doughnut shape. The yoke parts 523 and 524 are attached to the inside of the weights 533 and 534, respectively. An upper end of the respective yoke parts 523 and 524 is connected to an end of the respective spring members 531 and 532 to integrally vibrate the spring members 531 and 532, the weights 533 and 534, and the magnet assemblies 52 and 52'.

When a compressive force is applied to the one end and the other end of the spring members 531 and 532, a distance between a plane including the one end and a plane including the other end is reduced. Thereafter, the plane including the one end and the plane including the other end may be flush with each other or coplanar. When a tensile force is applied to the one end and the other end, the distance between the plane including the one end and the plane including the other end increases. Thereafter, a difference of the distances occurs by a value in which the tensile force is divided by a spring constant k ($x=F/k$). The spring members 531 and 532 may be coil springs.

The transfer member 54 is connected to the other end of the spring members 531 and 532 to transfer the vibration generated by the spring assemblies 53 and 53' to the outside. Although the transfer member 54 has a cylindrical shape in FIGS. 7A to 7D, the transfer member 54 may have a square pillar shape or a polygonal pillar shape. In this case, the spring member 531 and 532, the weights 533 and 534, and the magnet assemblies 52 and 52' may be changed in shape according to a horizontal sectional shape of the transfer member 54.

The oscillator 11 according to an embodiment of the invention includes the plurality of magnet assemblies 52 and 52' and the plurality of spring assemblies 53 and 53'. In the oscillator according to an embodiment of the invention, the plurality of magnet assemblies 52 and 52' and the plurality of spring assemblies 53 and 53' may share the coil assembly 51. That is, the plurality of magnet assemblies 52 and 52' may generate the electromagnetic force using a magnetic flux generated by one coil assembly 51. Also, the plurality of spring assemblies 53 and 53' may generate the vibration using the electromagnetic force generated by the plurality of magnet assemblies 52 and 52'.

Thus, since each of the magnet assemblies 52 and 52' and the spring assemblies 53 and 53' does not necessarily include the coil assembly, the vibration pattern generation unit 10 may be reduced in thickness and volume. Also, the number of the coil assemblies and the FPC may be reduced to reduce a weight of the vibration pattern generation unit 10 by the reduced number of the coil assemblies and the FPC.

The plurality of magnet assemblies 52 and 52' and the plurality of spring assemblies 53 and 53' of the oscillator 11 according to an embodiment of the invention may be symmetrically disposed centered about the coil assembly 51. As shown in FIGS. 7A and 7B, the coil assembly 51 may be disposed at a center of the oscillator 11, and the magnet assemblies 52 and 52', and the spring assemblies 53 and 53' may be successively disposed from the coil assembly 51 to an upper side or a lower side thereof.

In the plurality of magnet assemblies 52 and 52' and the plurality of spring assemblies 53 and 53' of the oscillator according to an embodiment of the invention, one magnet assembly and one spring assembly form a single layer, and the single layer may be stacked using the coil assembly as a boundary. That is, when the one magnet assembly 52 and the one spring assembly 53 form the single layer, the oscillator 11 of FIGS. 7A and 7B has two layers. The two layers are stacked in a height direction thereof. The coil assembly 51 is disposed at a boundary between the two layers. As described above, the plurality of spring assemblies 53 and 53' and the plurality of magnet assemblies 52 and 52' included in the each of the two layers share the coil assembly 51.

According to another embodiment of the invention, the oscillator may have three layers. In this case, the oscillator may include two coil assemblies 51. The respective coil assemblies 51 are disposed at boundaries between the three layers. The plurality of magnet assemblies 52 and 52' and the plurality of spring assemblies 53 and 53' may share the coil assembly 51.

FIG. 7C is a sectional view taken along line A-A' of the vibration pattern generation unit of FIG. 7A.

Referring to FIG. 7C, in the oscillator 11 according to an embodiment of the invention, the coil assembly 51 is disposed at a center of the case (or transfer member) 54. The magnet assemblies 52 and 52' and the spring assemblies 53 and 53' may be successively disposed in an upper or lower direction from the coil assembly 51.

The spring members 531 and 532 included in the spring assemblies 53 and 53' have one ends attached to the magnet assemblies 52 and 53 and the other ends attached to the inside of the case 54, respectively. Thus, the magnet assemblies 52 and 52' and the coil assembly 51 may interact with each other to vibrate the spring member 53 using the electromagnetic force as an external force.

In FIG. 7C, the coil assembly 51 includes only the coil part 511. Thus, an empty space is defined inside the coil part 511. Thus, the magnet parts 521 and 522 of the magnet assemblies 52 and 52' may be disposed in the empty space inside the coil part 511. With respect to the magnetic flux generated by the coil part 511, a density of the magnetic flux in the empty space inside the coil part 511 is greater than that of the magnetic flux outside the coil part 511. Thus, when the magnet parts 521 and 522 are disposed in the empty space inside the coil part 511, the generated electromagnetic force may increase.

When the coil assembly 51 includes the core part, the magnet parts 521 and 522 are not disposed in the empty space inside the coil part 511, but are disposed at an adjacent position to generate the electromagnetic force. The vibration generated using the electromagnetic force as an external force is transferred to the outside through the case 54.

Figure 7D:
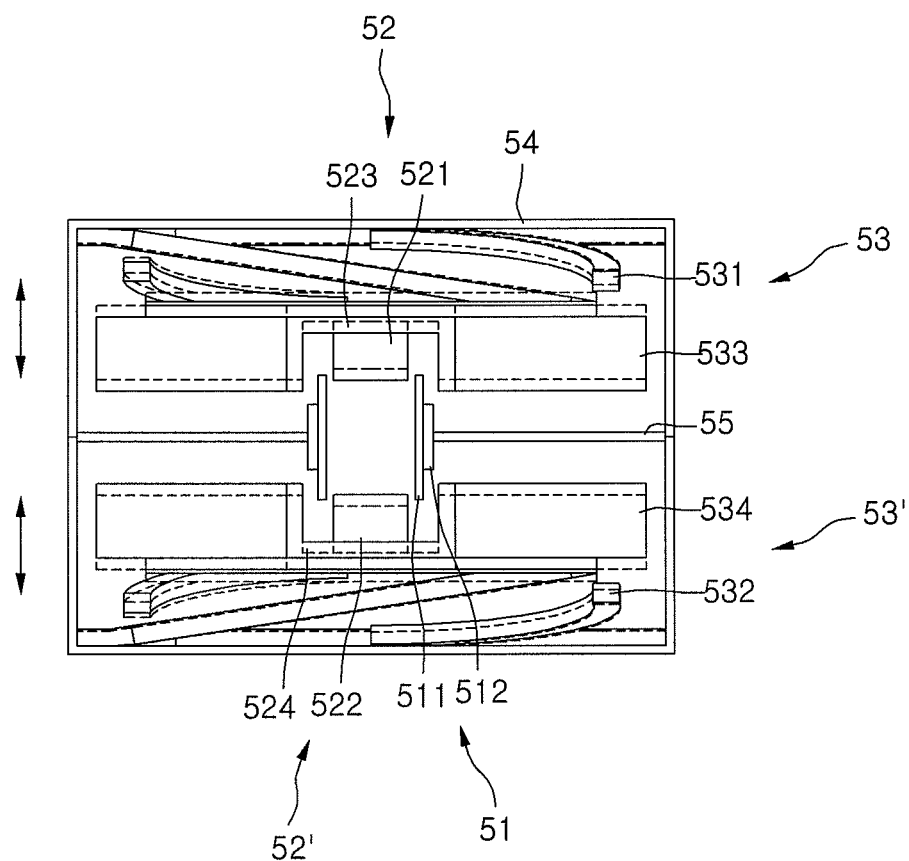
FIG. 7D is a view illustrating an example of an operation of the oscillator of FIG. 7A.

FIG. 7D is a sectional view illustrating a vibration process of the vibration pattern generation unit according to an embodiment of the invention.

Referring to FIG. 7D, the spring assemblies 53 and 53' generate a vibration in a vertical direction using the electromagnetic force generated by the interaction of the coil assembly 51 and the magnet assemblies 52 and 52' as an external force.

When the spring assemblies 53 and 53' include the weights 533 and 534, a vibration amount generated by the oscillator 11 increases due to a gravity and inertial force due to a self-weight of the weights 533 and 534.

According to an embodiment of the invention, the plurality of spring assemblies 53 and 53' have resonance frequencies different from each other. The resonance frequencies of the spring assemblies 53 and 53' may be determined according to configurations, positions, weights, magnetic forces of the spring member, the weights, the magnets, and yoke parts.

When the vibration generation parts have the resonance frequencies different from each other, whether the spring assemblies 53 and 53' are vibrated may be determined according to a frequency of the current applied to the core assembly 51. A resonance frequency of the upper spring assembly 53 is defined as f1, and a resonance frequency of the lower spring assembly 52' is defined as f2.

When a frequency of the current applied to the coil assembly 51 is f1, the upper spring assembly 53 is resonant and vibrated in a vertical direction. However, the lower spring assembly 53' is not vibrated or is vibrated very little due to mismatch of the resonance frequency.

On the other hand, when the frequency of the current applied to the coil assembly 51 is f2, the upper spring assembly is not vibrated or is vibrated very little. However, the lower spring assembly 53' may be resonant and vibrated in the vertical direction.

When the frequency of the current applied to the coil assembly 51 is f3, but not f1 or f2, all of the vibration generation parts are not vibrated or are vibrated very little.

When the frequency of the current applied to the core assembly 51 is a resultant wave of f1+f2, all of the spring assemblies 53 and 53' may be resonant to generate the vibration.

According to another embodiment of the invention, the spring assemblies 53 and 53' may have the same resonance frequency. In this case, when the frequency of the current applied to the coil assembly 51 matches the resonance frequency, all of the spring assemblies 53 and 53' are vibrated to increase the vibration amount to twice.

Thus, the oscillator 11 may realize a multi-mode vibration because the spring assemblies 53 and 53' have resonance frequencies different from each other. In addition, the vibration amount may be increased to twice due to the same resonance frequency.

Figure 8:
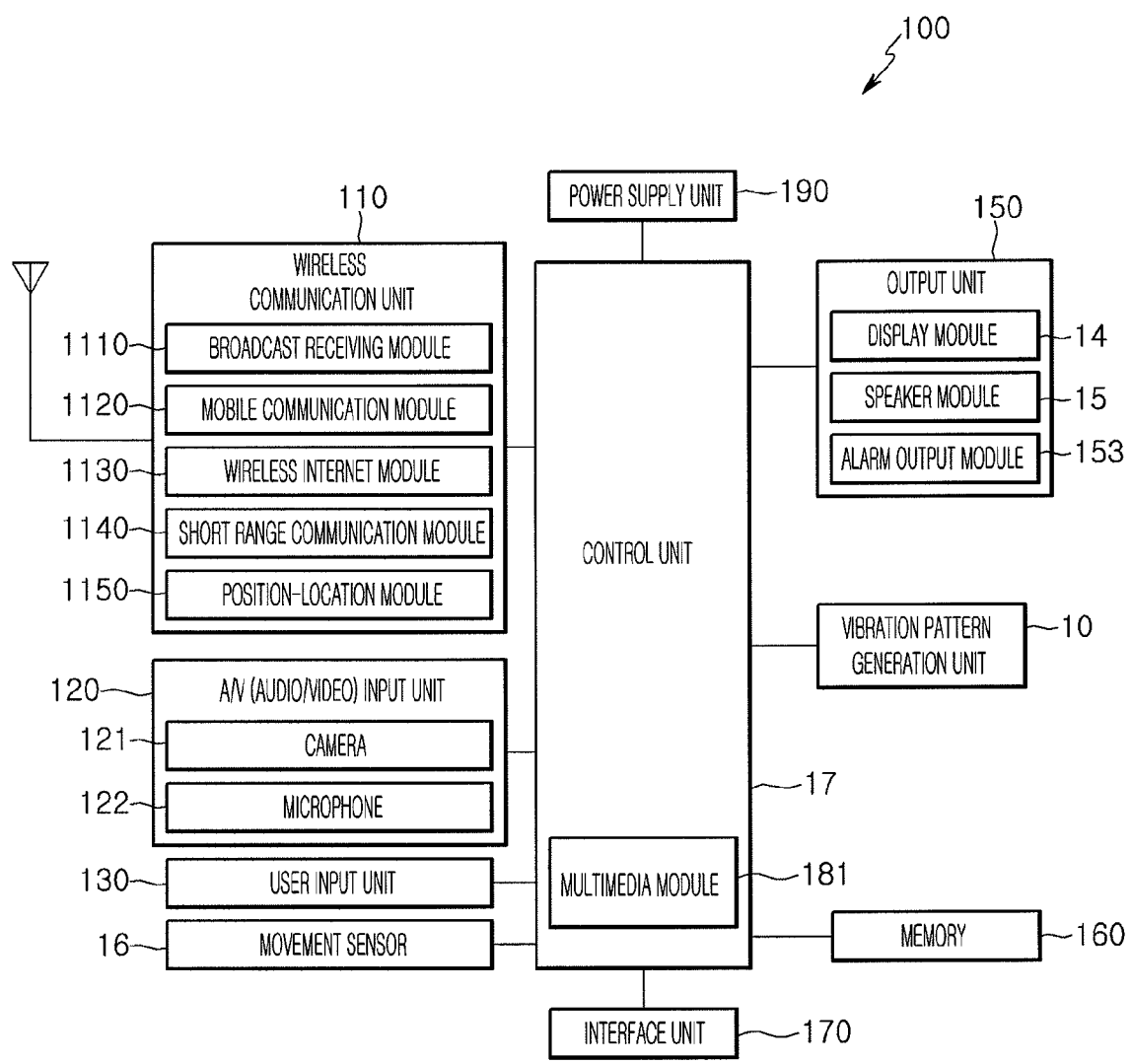
FIG. 8 is a block diagram of a mobile device including a vibration generation part according to an embodiment of the invention.

FIG. 8 is a block diagram of a mobile device according to an embodiment of the invention.

The mobile device 100 may be implemented using a variety of different types of devices. Examples of such devices include mobile phones, smart phones, notebook computers, digital broadcast devices, personal digital assistants (PDA), portable multimedia players (PMP), and navigators.

The mobile device 100 may include a vibration pattern generation unit 10, a communication unit (or a wireless communication unit) 110, an A/V (Audio/Video) input unit 120, a user input unit 130, a movement sensing unit (or movement sensor) 16, an output unit 150, a memory 160, an interface unit 170, a control unit 17, and a power supply unit 190. FIG. 8 illustrates a mobile device including various components. However, the components shown in FIG. 8 are not essential components. Accordingly, a mobile device may be configured with the number of components greater or smaller than the number of components described in FIG. 8.

Hereinafter, the above components will be described one after another.

The wireless communication unit 110 typically includes one or more components which permits wireless communication between the mobile device 100 and a wireless communication system or network within which the mobile device 100 is located. For example, the wireless communication unit 110 may include a broadcast receiving module 1110, a mobile communication module 1120, a wireless Internet module 1130, a short range communication module 1140, and a location information module (or position-location module) 1150.

The broadcast receiving module 1110 receives a broadcast signal and/or broadcast associated information from an external broadcast managing server via a broadcast channel. The broadcast channel may include a satellite channel and a terrestrial channel. The broadcast managing server may refer generally to a server which generates and transmits a broadcast signal and/or broadcast associated information or a sever which receives previously generated broadcast signal and/or broadcast associated information to transmit the signal and/or information to a device. Examples of the broadcast associated information include information associated with a broadcast channel, a broadcast program, a broadcast service provider, etc. Examples of the broadcast signal include a TV broadcast signal, a radio broadcast signal, data broadcast signal, and a broadcast signal in which the data broadcast signal is combined with the TV broadcast signal or the radio broadcast signal.

The broadcast associated information may be provided through a mobile communication network. In this case, the broadcast associated information may be received by the mobile communication module 1120.

The broadcast associated information may have various configurations. For example, the broadcast associated information may include an electronic program guide (EPG) of digital multimedia broadcasting (DMB) and electronic service guide (ESG) of digital video broadcast-handheld (DVB-H).

The broadcast receiving module 111 may be configured to receive broadcast signals transmitted from various types of broadcast systems. For example, such broadcasting systems include digital multimedia broadcasting-terrestrial (DMB-T), digital multimedia broadcasting-satellite (DMB-S), the data broadcasting system known as media forward link only (MediaFLO), video broadcast-handheld (DVB-H), and integrated services digital broadcast-terrestrial (ISDB-T). The broadcast receiving module 111 is adapted for the above-described digital broadcast systems and other broadcast systems providing broadcast signals.

A broadcast signal and/or broadcast associated information may be stored in the memory 160 through the broadcast receiving module 1110.

The mobile communication module 1120 may transmit/receive wireless signals to/from at least one of a base station, an external device, and a server. The wireless signals may include various types of data according to voice call signaling, image communication call signaling, or text/multimedia message communication.

The wireless internet module 1130 supports Internet access for the mobile device 100. This module may be internally or externally coupled to the mobile device 100.

The short range communication module 114 refers to a module for short range communication. Examples of short range communication technologies may include Bluetooth, RFID (Radio Frequency Identification), Infrared Data Association (IrDA), Ultra Wideband (UWB), and ZigBee.

Position-location module 1150 identifies or otherwise obtains the location of the mobile device 100. As a representative example, there is a Global Position System (GPS) module. The GPS module receives location information from a plurality of satellites. In this instance, the location information may include coordinate information displayed as latitude and longitude. For example, the GPS module measures precise time and distance from three or more satellites to precisely calculate a present position using three distances different from each other according to a triangulated method. In this instance, a method may be used in which the distance and time information are obtained from the three satellites, and an error thereof is corrected using one satellite may be used. In particular, the GPS module may precisely obtain the latitude, longitude, and altitude as well as 3-D speed information from the location information received from the satellites.

Audio/video (A/V) input unit 120 is configured to provide audio or video signal input to the mobile device 100. As shown, the A/V input unit 120 includes a camera 121 and a microphone 122. The camera 121 may process image frames such as still images or videos that are acquired by an image sensor in a video telecommunication mode or a photographing mode. The processed image frames may be displayed on the display module 14.

The image frames processed in the camera 121 may be stored in the memory or transmitted to the outside through the wireless communication unit 110. Two or more cameras 121 may be provided according to configuration of the mobile device 100.

The microphone 122 may receive external sound signals through a microphone in a call mode, a recording mode, or a voice recognition mode to process the external sound signals into electrical data, such as an electrical voice data. In the call mode, the processed data, such as an electrical voice data may be converted into a form that can be transmitted to a mobile communication base station through the mobile communication module 112. The microphone 122 may be configured with various noise removal algorithms for removing noises generated in the course of receiving the external sound signals.

The user input unit 130 generates input data responsive to user manipulation of an associated input device or devices. The user input unit 130 may include a keypad, a dome switch, a touchpad (e.g., static pressure/capacitance), a jog wheel and a jog switch. In particular, when the touch pad and the display module 14 form a layer structure together with each other, the touch pad may be referred to as a touch screen.

The movement sensing unit 16 may detect the open/close status of the mobile device 100, the location of the mobile device 100, the user's contact with the mobile device 100, the direction of the mobile device 100, the acceleration/deceleration of the movement of the mobile device 100, and the like, to generate sensing signals for controlling the operation of the mobile device 100. For example, when the mobile device 100 is configured as a slide-type mobile device, the sensing unit 16 may sense whether a sliding portion of the mobile device 100 is open or closed. Other examples include the sensing unit 16 sensing the presence or absence of power provided by the power supply unit 190, the presence or absence of a coupling or other connection between the interface unit 170 and an external device.

The interface unit 170 is often implemented to couple the mobile device 100 with external devices. For example, the interface unit 170 may include a wired/wireless headphone port, an external charger port, a wired/wireless data port, a memory card, a port connecting devices including identification modules to each other, an audio I/O (Input/Output) port, a video I/O (Input/Output) port, and an earphone port.

In this instance, the identification module may be a chip that stores various information for confirming a usage authority of the mobile device 100. The identification module may include a user identity module (UIM), a subscriber identity module (SIM), and a universal subscriber identity module (USIM). Also, a device including the identification module (hereinafter, referred to as an 'identification device') may be manufactured in a smart card shape. Thus, the identification device may be connected to the device 100 through a port. The interface unit 170 receives data from the external device or a power source to transmit the received data or the power to each of components within the mobile device 100 or transmit data within the mobile device 100 to the outside.

The output unit 150 is configured to output a video signal, an audio signal, or a touch signal, and may include a display module 14, a speaker module 15, and an alarm output module 153.

The display module 14 displays data processed in the mobile device 100. For example, when the mobile device 100 is in a call mode, the display module 14 displays a user interface (UI) or a graphic user interface (GUI). When the mobile device 100 is in the video telecommunication mode or the photographing mode, the display module 14 displays photographed or received images, UI, or GUI.

As describe above, when the display module 14 and the touch pad form the layer structure together with each other and thus is formed as the touch screen, the display module 14 may be used as an input unit in addition to the output unit. The display module 14 includes at least one of a liquid crystal display (LCD), a thin film transistor-liquid crystal display (TFT-LCD), an organic light-emitting diode display (OLED), a flexible display and a three-dimensional display. The mobile device 100 may include one or more of such display modules 14. For example, an external display unit and an internal display unit may be provided in the mobile device 100 at the same time.

The speaker module 15 outputs audio data received from the wireless communication unit 110 or stored in the memory 160 in a call signal reception, a call-receiving mode, a call-placing mode, a recording mode, a voice recognition mode, and a broadcast reception mode. Also, the speaker module 15 outputs audio signals (e.g., a call signal reception sound, a message reception sound, etc.) related to functions performed by the mobile terminal 100.

The alarm output module 153 may output signals to inform of the occurrence of an event of the mobile terminal 100. Examples of events generated in the mobile phone 100 may include call signal reception, message reception, key signal input, touch input. The alarm output module 153 may output signals to inform of the occurrence of a different event except the audio signal or video signal. For example, such output includes the providing of vibration to a user. When the call signal or massage is received, the alarm output module 153 may output the vibration to inform the reception of the call signal or massage. Alternatively, when a key signal is inputted, the alarm output module 153 may output vibration as a feedback with respect to the key input signal. The user may recognize the occurrence of the event through the vibration. The signal for informing the occurrence of the event may be outputted through the display module 14 or the voice output module 152.

As described above, the vibration pattern generation unit 10 includes at least one pair of oscillators 111 and 112 generating vibration, at least one driving part 12 driving the oscillators 111 and 112, and a vibration transfer part 13 transferring the vibration generated by the oscillators 111 and 112. The control unit 17 controls the vibration generated by the respective oscillators 111 and 112 to move a vibration minimum point formed on the vibration transfer part 13 by the vibration.

The memory 160 may store programs used for the operations of the control unit 17, or may temporarily store data (e.g., phonebooks, messages, still images, videos, etc.) that are to be inputted/outputted.

The memory 160 may include at least one type of storage media of flash memory type memory, multimedia card micro type memory, card type memory (e.g., SD or XD memory), random access memory (RAM), static random access memory (SRAM), read-only memory (ROM), electrically erasable programmable read-only memory (EEPROM), programmable read-only memory (PROM), magnetic memory, and magnetic or optical disk. Also, the mobile device 100 may operate a web storage performing a storage function of the memory 150 on the Internet.

The control unit 17 typically controls the overall operations of the mobile terminal 100. For example, the controller performs the control and processing associated with voice calls, data communications, video calls, camera operations and recording operations. Also, the controller may include a multimedia module 181 which provides multimedia playback. The multimedia module 181 may be configured as part of the control unit 17, or the multimedia module 181 may be implemented as a separate component.

The power supply unit 190 receives power from at least one of an external power source and internal power source to supply power required for operating each of the components under the control of the control unit 17.

Various embodiments of the invention described herein may be implemented in a computer-readable medium using, for example, computer software, hardware, or some combination thereof.

For a hardware implementation, the embodiments of the invention described herein may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a selective combination thereof. In some cases, such embodiments of the invention are implemented by the control unit 17.

For a software implementation, the embodiments of the invention described herein may be implemented with separate software modules, such as procedures and functions, each of which perform one or more of the functions and operations described herein. The software codes can be implemented with a software application written in any suitable programming language and may be stored in memory, for example, memory 160, and executed by a controller or processor, for example, control unit 17.

Hereinafter, a method of controlling a vibration pattern according to an input or output value of a mobile device 1 using a movement mechanism of the vibration minimum point will be described.

FIGS. 9A to 9D are views illustrating examples of vibration pattern control using a touch input of a user as an input value according to an embodiment of the invention.

Figure 9A:
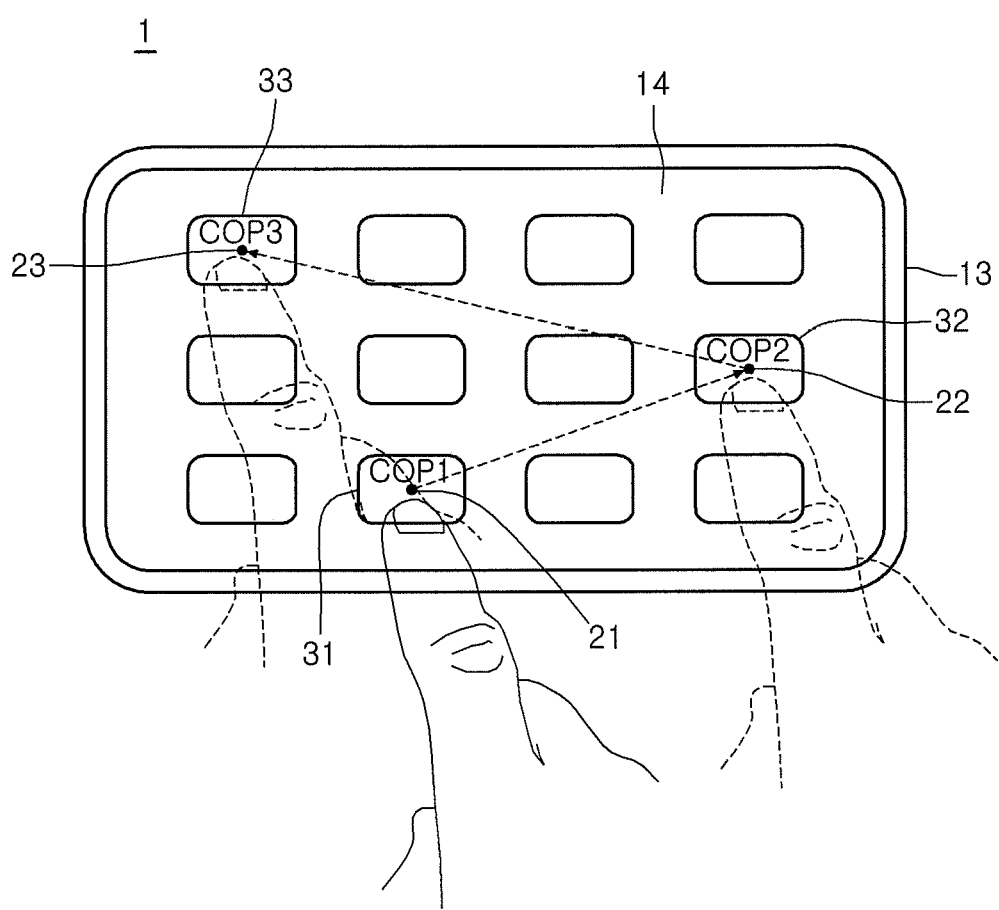
FIGS. 9A to 9D are views illustrating examples of vibration pattern control using a touch input of a user as an input value according to an embodiment of the invention.

Referring to FIG. 9A, according to an embodiment of the invention, the display module 14 may be a touch screen for detecting a touch input of a user. In this instance, an input value inputted into the mobile device 1 may be a touch point on the touch screen.

According to an embodiment of the invention, the control unit 17 may control such that the vibration minimum point is formed at the touch point.

For example, as shown in FIG. 9A, when the user touches icons 31, 32, and 33 displayed on the display module 14, the control unit 17 may receive coordinates of the touch point as an input value and control the vibration pattern generation unit 10 to form the vibration minimum point on the touch points 21, 22, and 23.

That is, when the user touches the first icon 31 in FIG. 9A, the vibration minimum point 21 is formed on the touched first icon 31. When the user touches the second icon 32, the vibration minimum point 22 is formed on the touched second icon 32. When the user touches the third icon 33, the vibration minimum point 23 is formed on the touched third icon 33. Accordingly, when a user touches an icon, the user is able to feel a vibration where the icon is selected.

Thus, although the oscillator is uniformly vibrated to provide the same vibration feeling regardless of the touch point of the user in the related art, according to an embodiment of the invention, the vibration minimum point may be formed at positions different from each other according to the touch point of the user to provide a haptic effect having dynamical feeling.

According to another embodiment of the invention, the control unit 17 may move the vibration minimum point along a drag path on the touch screen 14.

Figure 9B:
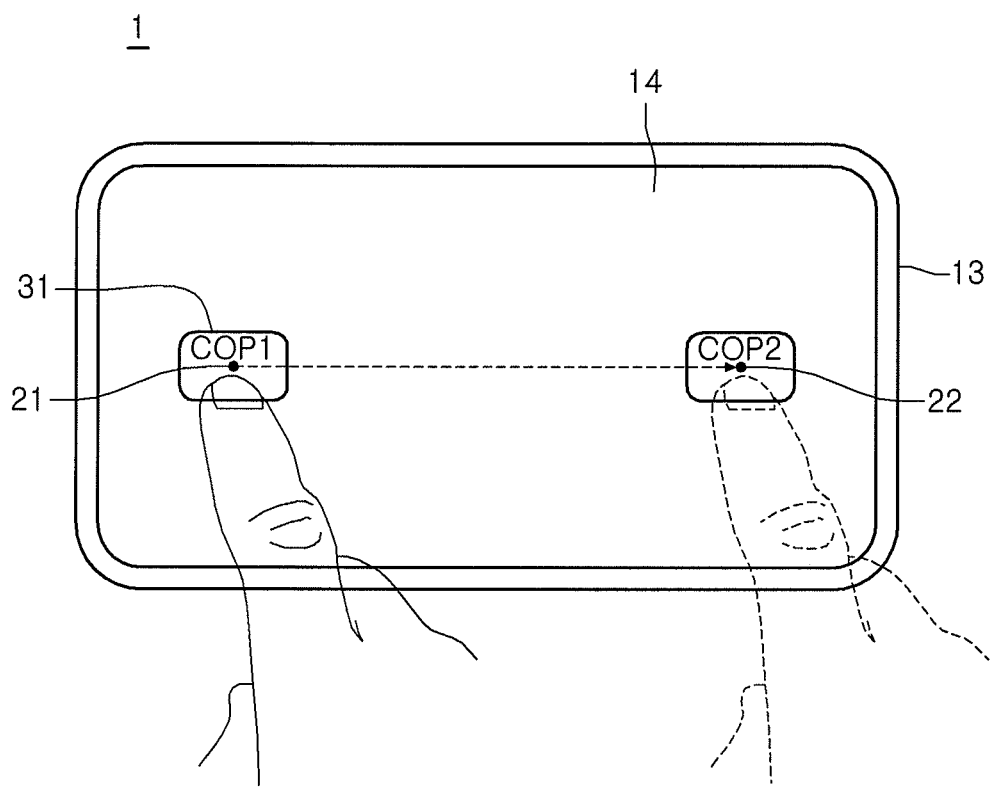

For example, as shown in FIG. 9B, when the user touches the icon 31 to drag the icon 31 to a predetermined position, the control unit 17 receives the drag path of the user as an input value and controls the vibration pattern generation unit 10 to move the vibration minimum point 21 along the drag path.

In FIG. 9B, the vibration minimum point 21 is sequentially or discretely moved along the drag path from a drag start point 21 to a drag end point 22.

According to another embodiment of the invention, the vibration minimum point may be moved along a straight line path as well as moved on a planar plane of the vibration transfer part 13 including the oscillator.

Figure 9C:
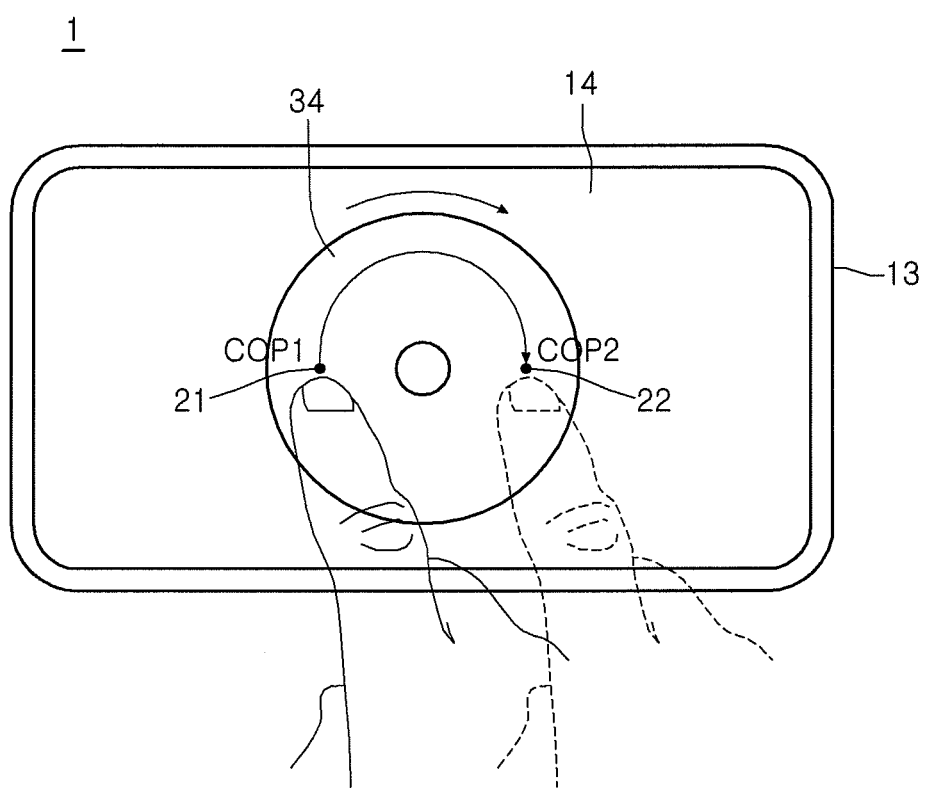

For example, the vibration minimum point may be moved along a straight line path as shown in FIG. 9B as well as moved along a curved path as shown in FIG. 9C.

In this case, to move the vibration minimum point on the planar plane as shown in FIG. 9C, two pair of oscillators, i.e., four oscillators 111, 112, 113, and 114 should be disposed on the vibration transfer part 13 as shown in FIG. 2E or 2F.

As a result, as shown in FIG. 9C, when the user drags the icon 34 in curved shape on the touch screen 14, the control unit 17 may individually control an intensity of phase of the vibration generated by the four oscillators 111, 112, 113, and 114 to move the vibration minimum point along the curved path.

Figure 9D:
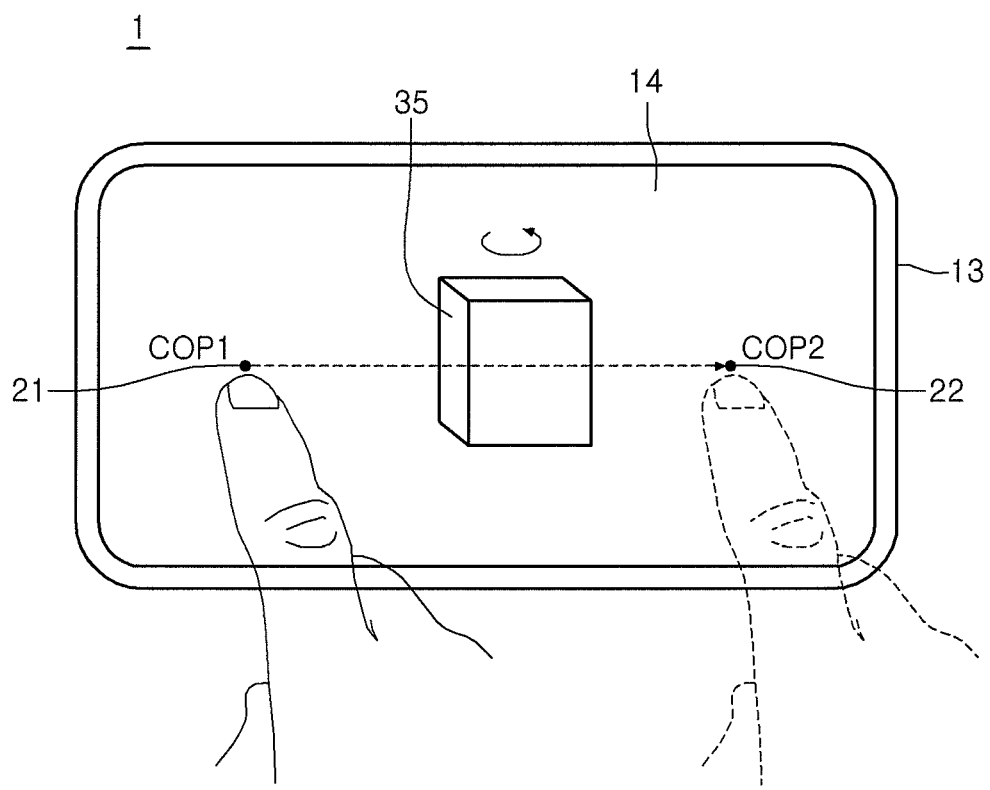

Also, as shown in FIG. 9D, according to an embodiment of the invention, the control unit 17 may move the vibration minimum point 21 along a touch input, which rotates a 3-D FIG. 35 displayed on the touch screen 14, i.e., the drag path.

For example, as shown in FIG. 9D, when the user rotatedly drag-inputs a regular hexahedron cubic 35 that is the 3-D figure in a space, the control unit 17 may receive the drag path as an input value to move the vibration minimum point 21 along the drag path.

According to another embodiment of the invention, the mobile device 1 may further include a movement sensor 16 for detecting the movement. The input value received into the mobile device 1 may be movement data detected by the movement sensor 16.

The movement sensor 16 may include at least one of an acceleration sensor, a gyro sensor, and a magnetic compass sensor.

The control unit 17 may move the vibration minimum point in a movement direction of the mobile device 1 detected by the movement sensor 16.

FIGS. 10A to 10e are views illustrating examples of a vibration pattern control using movement data of a movement sensor as an input value according to another embodiment of the invention.

Figure 10A:
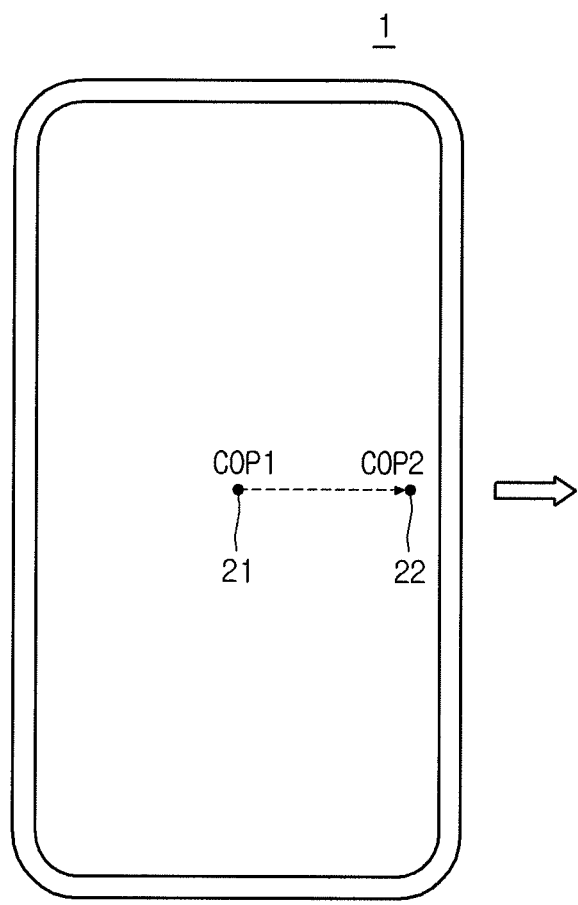
FIGS. 10A to 10E are views illustrating examples of a vibration pattern control using movement data of a movement sensor as an input value according to another embodiment of the invention.

Referring to FIG. 10A, according to an embodiment of the invention, the control unit 17 may receive the movement data of the mobile device 1 detected by the movement sensor disposed on the mobile device 1 as an input value to move the vibration minimum point 21 according to the received movement data.

In particular, as shown in FIG. 10A, when the mobile device 1 is moved in a right side, for example, when the user grasps the mobile device 1 to move the mobile device 1 in a right direction, the movement sensor 16, e.g., the acceleration sensor may detect the right side movement of the mobile device 1 to transmit the movement data to the control unit 17.

Then, the control unit 17 may control the vibration pattern generation unit 10 based on the movement data to move the vibration minimum point 21 formed by the vibration to the movement direction of the mobile device 1, i.e., the right direction.

Similarly, when the mobile device 1 is moved in a left, upward, or downward direction, the movement sensor 16 may detect the movement direction of the mobile device 1, and the control unit 17 may move the vibration minimum point 21 in the detected movement direction based on the movement direction of the mobile device 1.

Figure 10B:
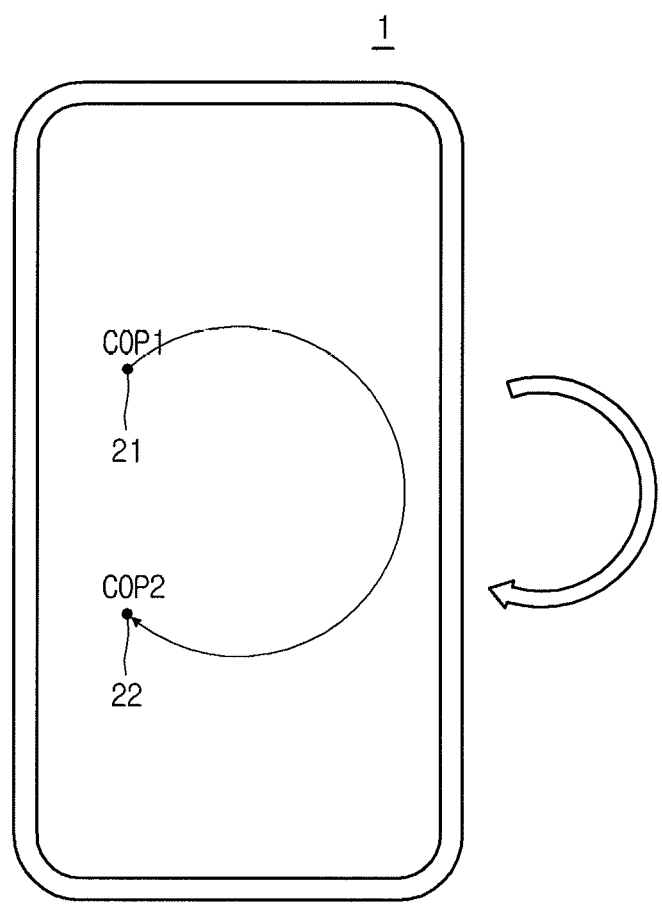

As shown in FIG. 10B, when the mobile device 1 is linearly moved, for example, when the mobile device 1 is moved in a circular shape, the control unit 17 may move the vibration minimum point 21 in the circular shape along the movement direction of the mobile device 1.

Figure 10C:
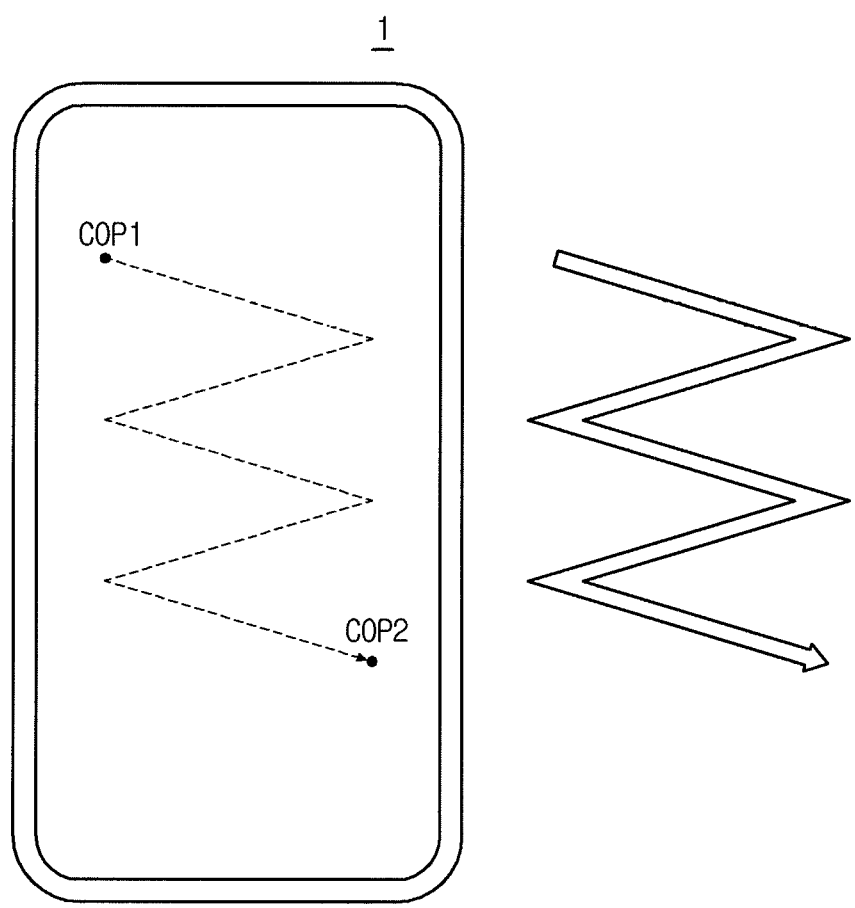

As shown in FIG. 10C, when the mobile device 1 is irregularly moved, the control unit 17 may move the vibration minimum point 21 along the movement direction of the mobile device 1.

According to another embodiment of the invention, the movement sensor 16 may detect a rotation of the mobile device 1 with respect to a predetermined axis, and the control unit 17 may move the vibration minimum point 21 corresponding to the detected rotation direction of the mobile device 1.

Figure 10D:
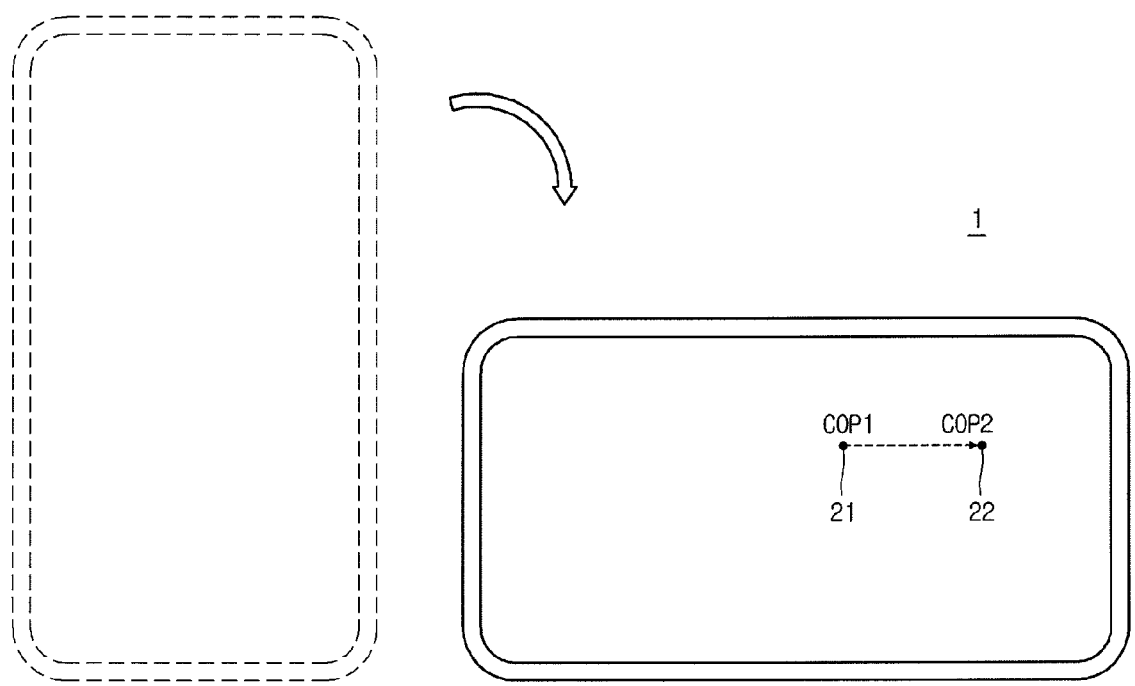

For example, as shown in FIG. 10D, when the mobile device 1 is rotated in a clockwise direction, the movement sensor 16 may detect the rotation of the clockwise direction, and the control unit 17 may move the vibration minimum point 21 corresponding to the detected rotation direction.

Figure 10E:
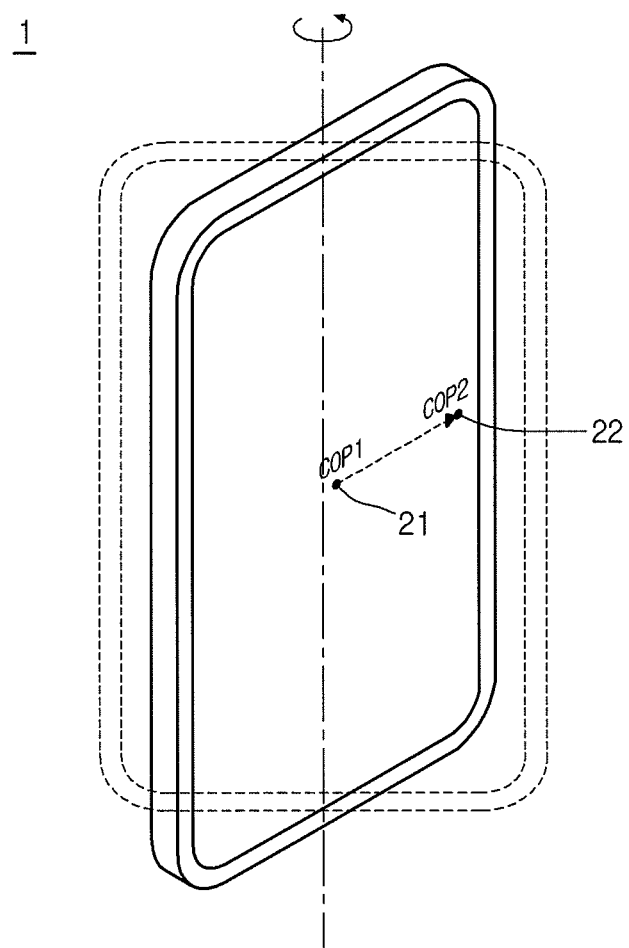

Also, as shown in FIG. 10E, when the mobile device 1 is tilted at a predetermined angle with respect to a predetermined rotation axis, e.g., a longitudinal axis of the mobile device 1, the movement sensor 16 may detect the tilting of the mobile device 1, and the control unit 17 may move the vibration minimum point 21 corresponding to the detected tilting direction and angle.

As a result, the mobile device 1 according to an embodiment of the invention may detect the movement thereof, rotation, and tilting to move the vibration minimum point corresponding to the detected movement, rotation, and tilting, thereby providing a haptic effect having dynamical feeling to the user.

According to another embodiment of the invention, the output value of the mobile device 1 may be a variation of an image displayed on the display module 14.

That is, according to another embodiment of the invention, the display module 14 displays a predetermined image. The displayed image is detected to move the vibration minimum point based on the detected image variation.

Figure 11A:
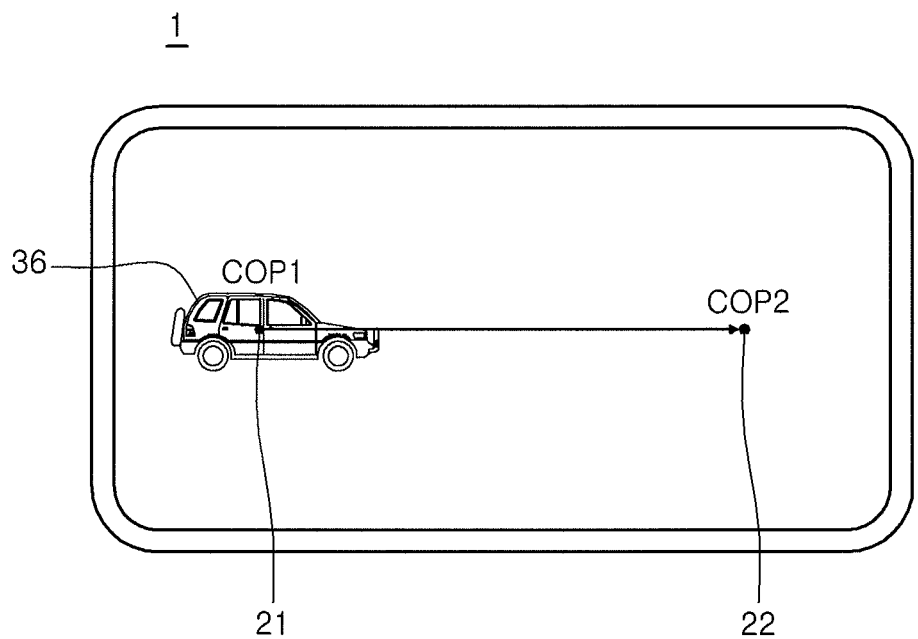
FIGS. 11A to 11B are views illustrating examples of a vibration pattern control using an image variation as an output value according to another embodiment of the invention.
Figure 11B:
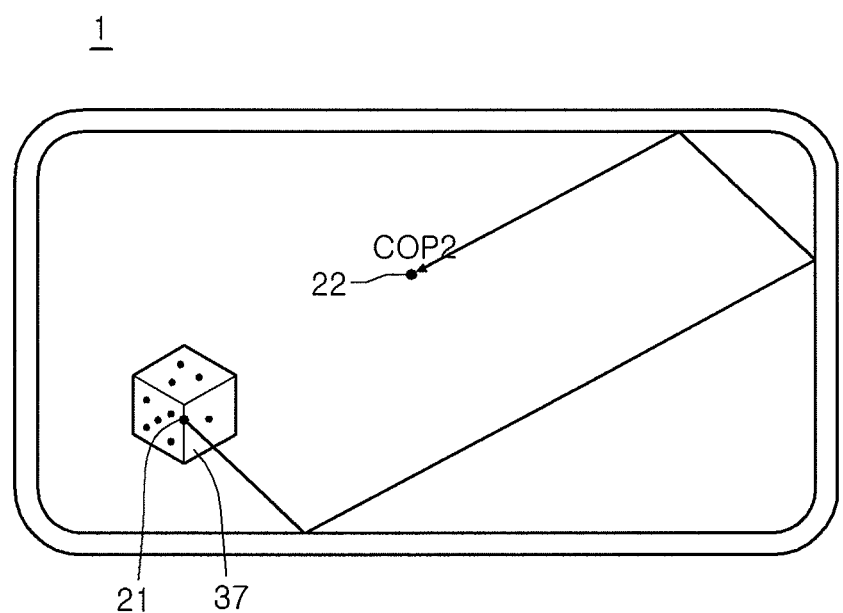

FIGS. 11A to 11B are views illustrating examples of a vibration pattern control using an image variation as an output value according to another embodiment of the invention.

According to an embodiment of the invention, the display module 14 displays an image 31. When the image 31 displayed on the display module 14 is varied, the control unit 17 may detect a variation of the image to move the vibration minimum point 21 corresponding to the detected image variation.

For example, as shown in FIG. 11A, when the display module 14 displays a vehicle as the image 36 and displays a moving picture of the vehicle, the control unit 17 may detect the image 36, i.e., a movement path of the vehicle to move the vibration minimum point 21 along the detected movement path.

As a result, in case where the mobile device 1 decodes a moving picture, when a moving picture of a specific object provided on moving picture, e.g., a vehicle is decoded, the control unit 17 may move the vibration minimum point along the movement of the object included in the image to provide visual contents as well as haptic vibration to the user.

Although the related art mobile device provides uniform vibration regardless of the decoded image, according to an embodiment of the invention, the vibration minimum point may be moved along the image to provide the realistically haptic effect to the user.

FIG. 11B is a view illustrating a movement of a vibration minimum point according to a displayed image variation according to another embodiment of the invention.

Referring to FIG. 11B, the display module 14 may display the image 37, e.g., an image in which a die is rolled on the display module 14. In this case, the control unit 17 may detect a movement path of the die, e.g., a movement vector of the die 37 on the display module 14 to move the vibration minimum point 21 along the detected movement vector of the die 37.

According to another embodiment of the invention, an image displayed on the display module 14 may be an object included in an image. The control unit 17 may control such that the vibration minimum point is formed at a point in which the object is displayed, varied, or vanished.

For example, when the display module 14 displays the square object on one point of the display module 14, the control unit 17 may form the vibration minimum point at the point at which the square object is displayed.

Also, when the square object is changed in a circular shape at a different point of the display module 14, the control unit 17 may form the vibration minimum point at the point at which the object is changed in shape.

Also, when the object is vanished at a different point of the display module 14, the control unit 17 may form the vibration minimum point at the point at which the object is vanished.

According to another embodiment of the invention, the mobile device 1 may further include a plurality of speaker modules 151 and 152 for outputting sound. The output value of the mobile device 1 may be a variation of sound outputted through the speaker modules 151 and 152.

Figure 12A:
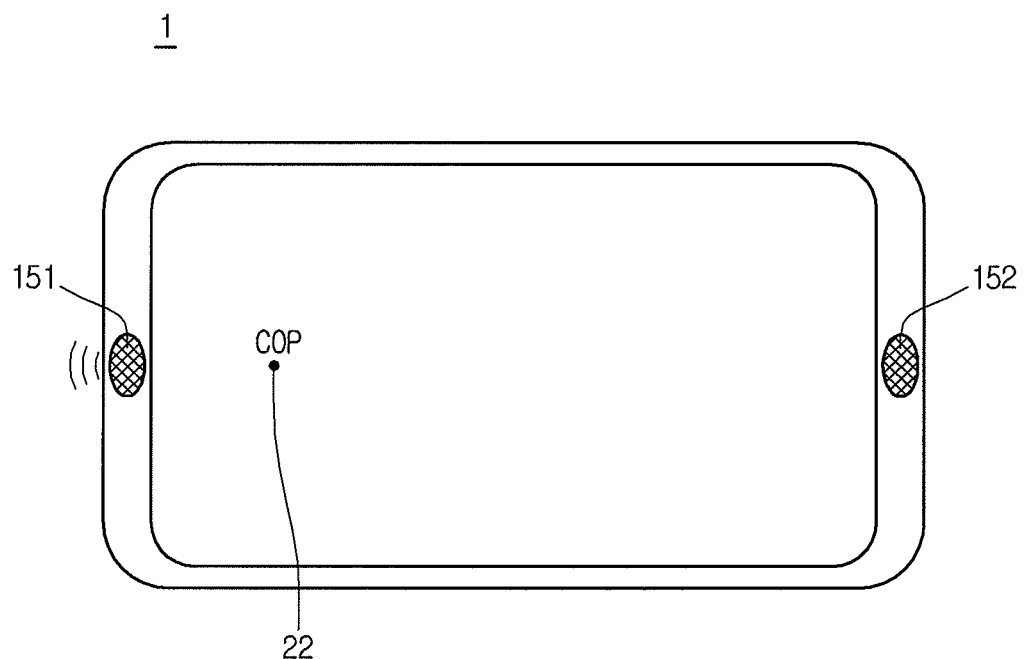
FIGS. 12A to 12C are views illustrating an example of a vibration pattern control using a sound variation as an output value according to another embodiment of the invention.
Figure 12B:
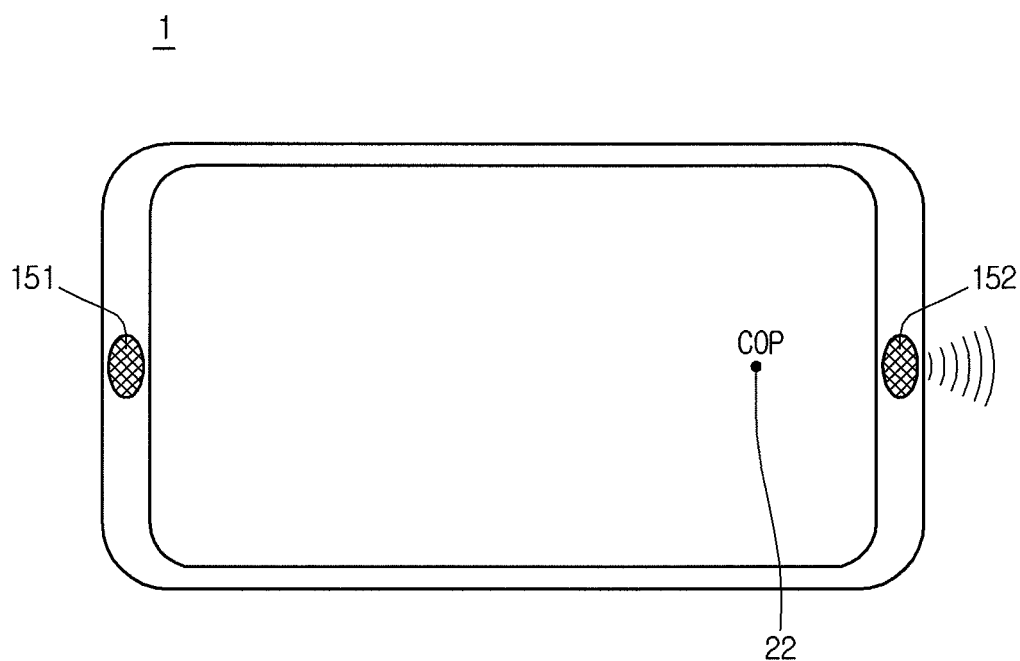
Figure 12C:
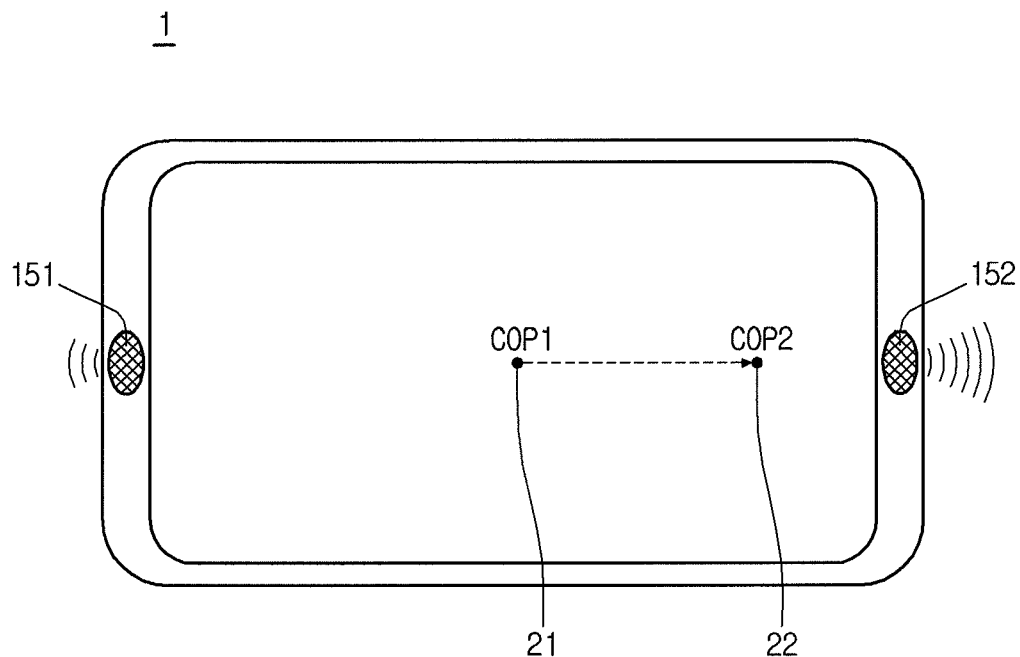

FIGS. 12A to 12C are views illustrating an example of a vibration pattern control using a sound variation as an output value according to another embodiment of the invention.

The mobile device 1 according to an embodiment of the invention includes a plurality of speakers 151 and 152, and the plurality of speakers 151 and 152 may output sounds different from each other.

According to an embodiment of the invention, the control unit 17 may form the vibration minimum point 21 adjacent to the speaker, through which the sound is outputted, of the plurality of speakers 151 and 152.

For example, as shown in FIG. 12*a*, when sound is outputted from the left speaker 151 of the plurality of speakers 151 and 152, the control unit 17 may form the vibration minimum point 21 adjacent to the left speaker 151.

On the other hand, as shown in FIG. 12B, when sound is outputted from the right speaker 152 of the plurality of speakers 151 and 152, the control unit 17 may form the vibration minimum point 21 adjacent to the right speaker 152.

According to another embodiment of the invention, the control unit 17 may move the vibration minimum point toward a speaker in which a volume of the outputted sound increases in the plurality of speakers 151 and 152.

For example, as shown in FIG. 12*c*, when the sound is outputted from all of the speakers 151 and 152 and a volume of the sound outputted from the right speaker increases, the control unit 17 may move the vibration minimum point 21 toward the right speaker 152.

As a result, when the mobile device 1 outputs stereo sound through the plurality of speakers 151 and 152, the haptic effect having dynamical feeling may be further provided to the user due to the outputted stereo sound.

Figure 13:
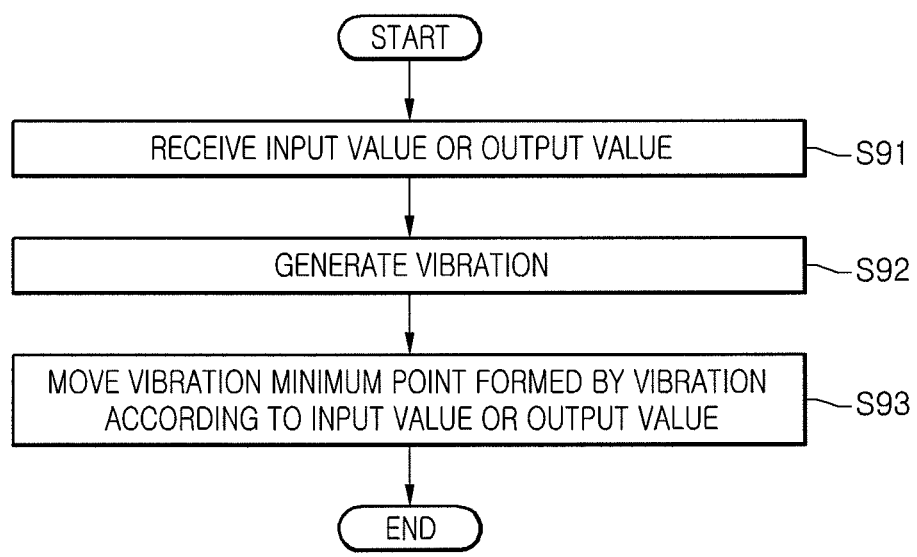
FIG. 13 is a flowchart illustrating a vibration pattern control method according to an embodiment of the invention.

FIG. 13 is a flowchart illustrating a vibration pattern control method according to an embodiment of the invention.

In operation S91, an input or output value is received. That is, a mobile device 1 according to an embodiment of the invention receives a predetermined input value inputted into the mobile device 1 or a predetermined output value outputted from the mobile device 1.

As described above, the input value may be a touch point coordinate that is touched by a user on a touch screen.

Also, the input value may be movement data of a movement sensor 16 detecting movement.

Also, the output value may be a variation of an image displayed on a display module 14 of the mobile device 1.

Also, the output value may be a variation of sound outputted from a speaker part 15 of the mobile device 1.

In operation S92, a vibration is generated. That is, the vibration is generated using at least one pair of oscillators 111 and 112 included in a vibration pattern generation unit 10.

In operation S93, a vibration minimum point formed by the vibration is moved according to the input and output values. That is, the vibration minimum point formed by the vibration generated by the oscillators 111 and 112 may be moved according to the received input and output values.

Any reference in this specification to "one embodiment," "an embodiment," "example embodiment," etc., refer to a particular feature, structure, or characteristic described in connection with the embodiment of the invention is included in at least one embodiment of the invention. The appearances of such phrases in various places in the specification are not necessarily all referring to the same embodiment of the invention. Further, when a particular feature, structure, or characteristic is described in connection with any embodiment of the invention, it is submitted that it is within the purview of one skilled in the art to effect such feature, structure, or characteristic in connection with other ones of the embodiments of the invention.

Although embodiments of the invention have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A mobile device for controlling a vibration, the mobile device comprising:
    an input unit configured to receive an input from a user or an external device;
    an output unit configured to generate an output;
    a vibration pattern generation unit configured to generate a vibration, and to move a center of the vibration within the mobile device according to the input from the input unit or the output from the output unit; and
    a control unit configured to control the vibration pattern generation unit so as to create a moving vibration sensation from a movement of the center of the vibration.

2. The mobile device according to claim 1, wherein the vibration pattern generation unit comprises:
    a vibration transfer part;
    at least one pair of oscillators disposed spaced apart from each other in the vibration transfer part, and configured to generate the vibration in vibration transfer part; and
    at least one driving part configured to drive the at least one pair of oscillators.

3. The mobile device according to claim 2, wherein the control unit controls at least one of intensity and phase of respective vibrations generated by the at least one pair of oscillators.

4. The mobile device according to claim 2, wherein the control unit fixes an intensity and phase of a vibration generated by a first of the at least one pair of oscillators, and changes an intensity of a vibration generated by a second of the at least one pair of oscillators to thereby move the center of the vibration within the vibration transfer unit.

5. The mobile device according to claim 1, wherein the input unit comprises a touch screen, and the input is received via a touch point on the touch screen.

6. The mobile device according to claim 5, wherein the control unit controls the center of the vibration to be located at the touch point.

7. The mobile device according to claim 5, wherein the control unit moves the center of the vibration along a drag path on the touch screen.

8. The mobile device according to claim 1, further comprising a movement sensor configured to detect a movement of the mobile device,
   wherein the input is movement data detected by the movement sensor.

9. The mobile device according to claim 8, wherein the movement sensor comprises at least one of an acceleration sensor, a gyro sensor, and a magnetic compass sensor.

10. The mobile device according to claim 8, wherein the control unit moves the center of the vibration in a detected movement direction of the mobile device.

11. The mobile device according to claim 1, wherein the output unit comprises a display module configured to display an image, and
   the output is a change in the image that is displayed on the display module.

12. The mobile device according to claim 11, wherein the image comprises an object, and the control unit controls the center of the vibration to be located at a point at which the object is displayed, changed, or vanished.

13. The mobile device according to claim 11, wherein the image comprises an object, and the control unit controls the center of the vibration to be moved along a movement path of the object.

14. The mobile device according to claim 1, wherein the output unit comprises a plurality of speakers configured to output a sound, and
   the output is a change in the output sound.

15. The mobile device according to claim 14, wherein the control unit moves the center of the vibration towards one of the plurality of speakers in which a volume of the output sound is changed.

16. A method for controlling a vibration in a mobile device, the method comprising:
   receiving an input via an input unit of the mobile device or an output from an output unit of the mobile device;
   generating the vibration; and
   moving a center of the vibration within the mobile device according to the input or the output.

17. The method according to claim 16, wherein the input unit is a touch screen and the input is a touch point on the touch screen.

18. The method according to claim 16, wherein the input unit is a movement sensor and the input is movement data generated by a movement sensor detecting a movement.

19. The method according to claim 16, wherein the output unit is a display module, and the method further comprises displaying an image on the display module before the receiving of the input or the output, and
   the output is a change in the displayed image.

20. The method according to claim 16, wherein the output unit is a plurality of speakers, and the method further comprises outputting sound through the plurality of speakers before the receiving of the input or the output, and
   the output is a change in the output sound.

* * * * *